(12) United States Patent
Rosenthal et al.

(10) Patent No.: US 8,798,964 B2
(45) Date of Patent: Aug. 5, 2014

(54) METHODS AND APPARATUS FOR DESIGNING THE RACKING AND WIRING CONFIGURATIONS FOR PIECES OF HARDWARE

(75) Inventors: Richard Edwin Rosenthal, Carmel, CA (US); Troy Alexander Shahoumian, Sunnyvale, CA (US); Julie Ann Ward, Redwood City, CA (US); John Wilkes, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 2123 days.

(21) Appl. No.: 10/289,662

(22) Filed: Nov. 6, 2002

(65) Prior Publication Data

US 2004/0088145 A1 May 6, 2004

(51) Int. Cl.
*G06F 17/50* (2006.01)
*G06F 17/10* (2006.01)
*G06F 19/00* (2011.01)
*H04Q 1/02* (2006.01)

(52) U.S. Cl.
CPC ............. *G06F 17/509* (2013.01); *G06F 17/50* (2013.01); *G06F 2200/1638* (2013.01); *H04Q 1/02* (2013.01); *G06F 2217/38* (2013.01)
USPC ........... 703/1; 703/2; 703/13; 700/95; 700/97

(58) Field of Classification Search
CPC G06F 17/509; G06F 17/50; G06F 2200/1638
USPC .................. 703/1, 7; 361/826, 828
See application file for complete search history.

(56) References Cited

U.S. PATENT DOCUMENTS

| 3,705,410 | A | * | 12/1972 | Kooy et al. .................... 705/8 |
| 4,554,625 | A | * | 11/1985 | Otten .......................... 700/171 |
| 4,554,635 | A | * | 11/1985 | Levine ......................... 700/183 |
| 4,630,219 | A | * | 12/1986 | DiGiacomo et al. ............. 716/9 |
| 4,758,960 | A | * | 7/1988 | Jung ............................ 700/134 |
| RE33,416 | E | * | 10/1990 | Konishi et al. ................ 700/217 |
| 5,175,692 | A | * | 12/1992 | Mazouz et al. ............... 700/217 |

(Continued)

FOREIGN PATENT DOCUMENTS

JP  410067412 A  *  3/1998

OTHER PUBLICATIONS

A Heuristic Algorithm and Simulation Approach to Relative Location of Facilities; Gordon C Armour et al; Management Science, vol. 9, No. 2 (Jan. 1963) p. 294-309 (INFORMS—JSTOR).*

(Continued)

*Primary Examiner* — Akash Saxena

(57) ABSTRACT

In one embodiment of the invention, a method of designing the racking configuration for boxes in racks and for determining which connections go between different racks, including: solving a rack select optimization sub-problem to determine racks to use; and solving a rack assign optimization sub-problem to determine which particular rack will hold a particular box. In another embodiment, an apparatus for designing the racking configuration for boxes in racks and for determining which connections go between different racks, including: a machine-readable representation for a racking configuration problem; and a solver that can read that machine-readable representation and that is configured to: solve a rack select optimization sub-problem to determine at least one rack to use; and solve a rack assign optimization sub-problem to determine which particular rack will hold at least one box.

38 Claims, 11 Drawing Sheets

(56) References Cited

U.S. PATENT DOCUMENTS

| | | | |
|---|---|---|---|
| 5,257,387 A * | 10/1993 | Richek et al. | 713/600 |
| 5,293,479 A * | 3/1994 | Quintero et al. | 715/841 |
| 5,430,831 A * | 7/1995 | Snellen | 700/217 |
| 5,506,950 A * | 4/1996 | Hughes et al. | 345/420 |
| 5,515,524 A * | 5/1996 | Lynch et al. | 703/13 |
| 5,535,134 A * | 7/1996 | Cohn et al. | 716/112 |
| 5,617,514 A * | 4/1997 | Dolby et al. | 706/45 |
| 5,630,025 A * | 5/1997 | Dolby et al. | 706/46 |
| 5,745,363 A * | 4/1998 | Rostoker et al. | 700/121 |
| 5,850,539 A * | 12/1998 | Cook et al. | 703/20 |
| 5,930,779 A * | 7/1999 | Knoblock et al. | 705/412 |
| 5,991,759 A * | 11/1999 | Knoblock et al. | 707/10 |
| 6,023,699 A * | 2/2000 | Knoblock et al. | 709/223 |
| 6,098,050 A * | 8/2000 | Knoblock et al. | 705/28 |
| 6,134,511 A * | 10/2000 | Subbarao | 703/6 |
| 6,169,987 B1 * | 1/2001 | Knoblock et al. | 707/10 |
| 6,263,382 B1 * | 7/2001 | Bartlett et al. | 709/220 |
| 6,317,599 B1 * | 11/2001 | Rappaport et al. | 703/2 |
| 6,374,200 B1 * | 4/2002 | Nakagawa | 703/8 |
| 6,378,119 B1 * | 4/2002 | Raves | 716/10 |
| 6,384,842 B1 * | 5/2002 | DeKoning et al. | 709/223 |
| 6,452,805 B1 * | 9/2002 | Franz et al. | 361/724 |
| 6,732,268 B1 * | 5/2004 | Christopher et al. | 713/100 |
| 6,779,183 B1 * | 8/2004 | Chekuri et al. | 718/105 |
| 6,845,208 B2 * | 1/2005 | Thibault et al. | 385/135 |
| 6,859,366 B2 * | 2/2005 | Fink | 361/690 |
| 6,876,958 B1 * | 4/2005 | Chowdhury et al. | 703/7 |
| 7,043,407 B2 * | 5/2006 | Lynch et al. | 703/1 |
| 7,146,353 B2 * | 12/2006 | Garg et al. | 1/1 |
| 7,191,107 B2 * | 3/2007 | Andrzejak et al. | 703/2 |
| 7,286,969 B2 * | 10/2007 | Shahoumian et al. | 703/1 |
| 7,313,503 B2 * | 12/2007 | Nakagawa et al. | 703/1 |
| 8,131,515 B2 * | 3/2012 | Sharma et al. | 703/1 |
| 8,249,825 B2 * | 8/2012 | VanGilder et al. | 702/182 |
| 8,315,841 B2 * | 11/2012 | Rasmussen et al. | 703/1 |
| 8,560,291 B2 * | 10/2013 | Bagchi et al. | 703/13 |
| 8,688,413 B2 * | 4/2014 | Healey et al. | 703/2 |
| 2002/0107671 A1 * | 8/2002 | Ballus | 703/1 |
| 2002/0107674 A1 * | 8/2002 | Bascle et al. | 703/1 |
| 2003/0067745 A1 * | 4/2003 | Patel et al. | 361/690 |
| 2003/0110102 A1 * | 6/2003 | Chien et al. | 705/28 |
| 2003/0115024 A1 * | 6/2003 | Snevely | 703/1 |
| 2003/0233626 A1 * | 12/2003 | Tsuruta et al. | 716/10 |
| 2004/0083017 A1 * | 4/2004 | Brown et al. | 700/97 |
| 2004/0088145 A1 * | 5/2004 | Rosenthal et al. | 703/1 |
| 2005/0043836 A1 * | 2/2005 | Jaworski et al. | 700/98 |
| 2005/0182601 A1 * | 8/2005 | Deguchi | 703/1 |
| 2005/0240605 A1 * | 10/2005 | Knoblock et al. | 707/100 |
| 2005/0259383 A1 * | 11/2005 | Ewing et al. | 361/622 |
| 2005/0259397 A1 * | 11/2005 | Bash et al. | 361/699 |
| 2005/0265359 A1 * | 12/2005 | Drew et al. | 370/400 |
| 2005/0278151 A1 * | 12/2005 | Stayer | 703/1 |
| 2006/0047486 A1 * | 3/2006 | Lebraut | 703/1 |
| 2006/0075764 A1 * | 4/2006 | Bash et al. | 62/178 |
| 2006/0178864 A1 * | 8/2006 | Khanijo et al. | 703/20 |
| 2007/0078635 A1 * | 4/2007 | Rasmussen et al. | 703/1 |
| 2007/0174024 A1 * | 7/2007 | Rasmussen et al. | 703/1 |
| 2008/0077366 A1 * | 3/2008 | Neuse et al. | 703/2 |
| 2009/0150123 A1 * | 6/2009 | Archibald et al. | 703/1 |
| 2010/0106464 A1 * | 4/2010 | Hlasny et al. | 703/1 |
| 2010/0287018 A1 * | 11/2010 | Shrivastava et al. | 705/8 |
| 2010/0318329 A1 * | 12/2010 | Uraki et al. | 703/1 |
| 2012/0059628 A1 * | 3/2012 | VanGilder et al. | 703/1 |
| 2012/0209573 A1 * | 8/2012 | Karrat | 703/1 |
| 2013/0317787 A1 * | 11/2013 | Karrat | 703/1 |
| 2014/0074444 A1 * | 3/2014 | Hamann et al. | 703/2 |

OTHER PUBLICATIONS

Using a Co-Operative Co-Evolutionary Genetic Algorithm to Solve a Three-Dimensional Container Loading Problem; C. Pimpawat et al; IEEE 2001.*

The Application of the Distributed Genetic Algorithm to the Decision of the Packing in Containers Problem; Litvinenko Vladimir I. et al; Proceedings of the 2002 IEEE International Conference on Artificial Intelligence Systems (ICAIS'02).*

Attribute-managed storage; Richard Golding, Elizabeth Shriver, Tim Sullivan, and John Wilkes; Workshop on Modeling and Specification of I/O (MSIO), Oct. 26, 1995.*

What is a Floorplan?; Ralph H.J.M. Otte; ISPD 2000, San Diego, CA.2000 ACM; p. 212-217.*

Automatic Floorplan Design; Ralph H.J.M. Otten; IBM Thomas J. Watson Research Center; 1982 IEEE.*

The Pantheon storage-system simulator; John Wilkes; Hewlett-Packard Laboratories, Palo Alto, CA; Dec. 29, 1995.*

Minerva: An automated Resource Provisioning Tool for Large Scale Storage Systems; G.A> Alvarez et al ; ACM Nov. 2001; vol. 19 No. 4 p. 483-518.*

Optimal Resource Assignment in Internet Data Centers; Xiaoyun Zhu et al; Appeared in the Proceedings of the Ninth International Symposium on Modeling, Analysis, and Simulation of Computer and Telecommunications Systems, pp. 61-69, Cincinnati, Ohio, Aug. 2001. © IEEE.*

The New, Improved PowerVault SAN Configuration Tool; by Jeff Echols (Issue 2 2001); http://www.dell.com/content/topics/global.aspx/power/en/ps2q01_echols?c=us&cs=RC968571&l=en&s=hea.*

Paul E. Black, "knapsack problem", in Dictionary of Algorithms and Data Structures [online], Paul E. Black, ed., U.S. National Institute of Standards and Technology. Oct. 11, 2007 http://www.nist.gov/dads/HTML/knapsackProblem.html.*

Weisstein, Eric W. "Knapsack Problem." From MathWorld—A Wolfram Web Resource. http://mathworld.wolfram.com/KnapsackProblem.html 1999-2008.*

* cited by examiner r,s = racks (rack instances)
a,b = boxes (box instances)

X(b,r) = 1 if box b is
assigned to
rack r

Z(a,r,b,s,) = quadratic term
x(a,r) * x(b,s)
(r<>s)

EXAMPLE RESULTS

X(310, big1) = 1
X(315, big1) = 1
X(320, big1) = 2
Z(330, big1, 325,small1) = 1
Z(330, big1,310,small1) = 0
X(330, big1) = 1
X(325, small1) = 1

METHODS AND APPARATUS FOR
DESIGNING THE RACKING AND WIRING
CONFIGURATIONS FOR PIECES OF
HARDWARE

TECHNICAL FIELD

Embodiments of the present invention relate generally to methods and apparatus for designing the racking and wiring configurations for pieces of hardware such as, for example, networked devices.

BACKGROUND

The rack configuration problem is defined as follows. We are given a set of boxes, a set of racks (e.g., bookcase-like structures), and a set of places to put the racks. Some or all of the boxes may have one or more connections or links to other boxes. The racks may be extant, or may merely be a set of available rack types that could be used, perhaps with limits on the number available. The placement of boxes in racks is constrained by physical limits such as their size (a rack holds only a certain amount or number of boxes), power (a rack can only support a certain power drain from the boxes it holds), and so forth. The objective is to decide where to position the boxes into the racks and how to place the racks themselves, subject to these conditions, in such a way as to minimize various objectives, such as the number or cost of the racks used, the total length of the links between racks, or the number of links that cross rack boundaries.

In the most general case, a rack can be any container of boxes, a box can be any entity that can be placed in a rack.

A particular example of interest occurs when the boxes are computer or network components, such as network devices, computers, storage devices, hubs, switches, routers, displays, keyboards, storage area network (SAN) devices, fans, air ducts, telecommunication devices, telephone equipment such as telephones, computer system components, Internet data center devices, local area network (LAN) devices, disk array components, tape library devices, UNIX system components, WINDOWS system components, I/O subsystems, I/O and storage controllers, power supplies, cooling units, and other electronic devices. In what follows, the terms "box", "device", and "component" will be used to encompass all of these kinds of boxes, as well as any other item that could be placed in a rack subject to constraints such as the rack's capacity.

In the computer network case, the racks are often standard computer-system mounting racks, which typically hold boxes that are designed with one or two standard widths and a range of heights, often expressed in terms of "units", but other types of rack are possible and relevant for this problem. Again, in what follows, the term "rack" will be used to include all of these possibilities, as well as any entity that can hold one or more boxes and may need placement itself.

Similarly, a link can be any connection between two boxes, including a computer network link such as a copper, optical fibre, laser, or wireless link, which can itself be used as an Ethernet, FibreChannel, InfiniBand, telephone, wide-area, local-area, campus-area, metropolitan-area, serial, parallel, or other link type. Links can include other types of connections, too, such as pipes (e.g., for cooling fluids, hydraulic lines, or compressed air), cables (for mechanical effects), and so on. To simplify exposition, this document uses computer network components and devices as an exemplar problem domain, but this in no way limits the scope of what is described herein.

One current solution to designing the racking and wiring configurations for networked devices is by manually designing the configurations. In designing the configurations for storage area network (SAN) devices, the above solution can sometimes be facilitated with the use of visualization software such as, for example, various computer-graphics drawing programs. However, this manual-based solution can be extremely time-consuming, suboptimal and error-prone for realistic-sized SANs.

Another current solution to designing the racking and wiring configurations is to use a canned solution structure, such as the "group common components together" approach. However, this solution is also error-prone and typically results in designs that are more expensive than necessary.

Another current solution in designing the racking and wiring configurations is to use existing algorithms for the bin-packing problem, which will ensure that the boxes (e.g., SAN devices, computers, hubs, switches, and/or the like) are loaded into the minimum number of racks. However, this solution disadvantageously disregards the cost and vulnerability of inter-rack wiring (i.e., wiring links that span between racks).

Thus, the current approaches and/or technologies are limited to particular capabilities and/or suffer from various constraints.

SUMMARY OF EMBODIMENTS OF THE
INVENTION

At least some of the various embodiments are now described. In one embodiment of the invention, a method of designing the racking configuration for boxes in racks and for determining which connections go between different racks, includes:

solving a rack select optimization sub-problem to determine racks to use; and solving a rack assign optimization sub-problem to determine which particular rack will hold a particular box.

In another embodiment, an apparatus for designing the racking configuration for boxes in racks and for determining which connections go between different racks, includes:

a machine-readable representation for a racking configuration problem; and a solver that can read that machine-readable representation and that is configured to: solve a rack select optimization sub-problem to determine at least one rack to use; and solve a rack assign optimization sub-problem to determine which particular rack will hold at least one box.

Other embodiments of the invention include, but are not limited to, the various embodiments described below.

These and other features of an embodiment of the present invention will be readily apparent to persons of ordinary skill in the art upon reading the entirety of this disclosure, which includes the accompanying drawings and claims.

DETAILED DESCRIPTION OF PREFERRED EMBODIMENTS

Figure 1:
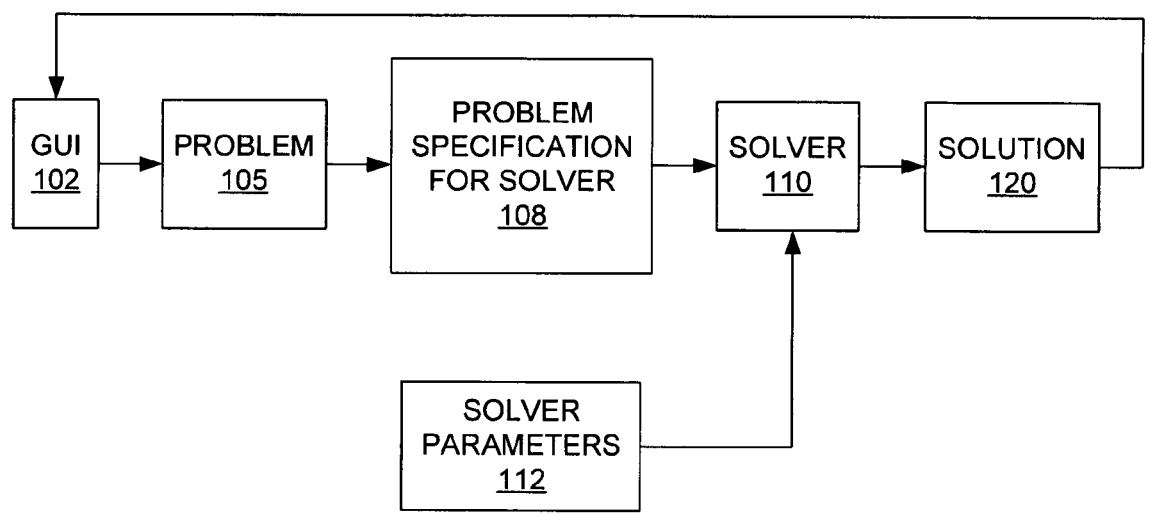
FIG. 1 is a block diagram that illustrates a relationship between an optimization problem description and a solver, in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

A networked system may include "boxes" (i.e., pieces of hardware or components) that need to be linked to each other to permit communication or functionality between the boxes. In an embodiment, the present invention provides a method and apparatus to automatically design the racking and wiring configuration for boxes in the networked system. The boxes and connections (links) between the boxes may be selected manually, or by use of a design tool, or by any other method. For example, components for a SAN may be selected by use of a SAN fabric design tool such as the SAN Configuration Tool from DELL COMPUTER CORPORATION, Round Rock, Tex.; the SAN Designer from TRUESAN NETWORKS, INC., San Jose, Calif.; or the Appia design tool described in "Appia: automatic storage area network design", by Julie Ward, Michael O'Sullivan, Troy Shahoumian, and John Wilkes (published in Conference on File and Storage Technology (FAST' 02), pp. 203-217 (28-30 Jan. 2002, Monterey, Calif.) by USENIX, Berkeley, Calif.), which is hereby fully incorporated herein by reference.

The boxes are placed in structures called "racks".

In the racking and wiring configuration design problem, the following sub-problems are typically considered:

(1) How many of each available rack type should be used for holding the selected boxes?

(2) In which rack should each box be placed?

(3) Where in each rack should each box be placed?

(4) What should be the layout of the loaded racks?

That is, in which physical location should each rack be placed?

Typically, the design objective(s) is at least one of the following: to minimize the cost of the racks, to minimize the number of used racks, to minimize the floor space or volume used by the racks (or the cost of same), to minimize the electrical, heating, or cooling load imbalance, and to minimize the wiring between racks (i.e., the number, cost and/or length of wires between racks). Many other possible objectives will be apparent to those skilled in the art. The constraints typically imposed on the design problem may include at least one of the constraints on the dimensions of the racks, power and cooling requirements, presence and/or quantity of uninterruptable power supply (UPS), cable length, and other conditions that the user may specify in the design problem. Again, many other constraints will be apparent to those skilled in the art, and these should be taken only as exemplary constraints and objectives.

In an embodiment, the invention provides a method that can be executed by a computer. As a result, the method can solve much larger design problems than a human can solve by hand and can typically produce error-free designs that are usually more cost-effective as compared to designs produced by current approaches. As compared to existing methods, embodiments of the invention can model the special features of the racking and wiring problem more accurately and thus can produce more effective designs.

As described in detail below, an embodiment of the invention provides an optimization-based approach to the racking and wiring of pieces of hardware such as, for example, networked boxes or other hardware that were mentioned above. The embodiment may have versatility for application to a large variety of computer network (or other network) design problems. In one embodiment, a method for designing the racking and wiring configuration for pieces of hardware includes separating the design problem into four optimization sub-problems for rack selection, rack assignment, box placement, and rack layout. The method may provide flexibility to the user for guiding the solution, by allowing the user to adapt the optimization objective and constraints to their specific concerns. The user may choose to alter the objective depending on which concerns are the most important (where the concerns may include, for example, minimizing rack cost, saving floor space, preventing overheating by balancing power requirements, keeping the racks uncluttered to facilitate maintenance, and/or other concerns).

It is noted that embodiments of the invention are not limited to designs of storage area networks.

FIG. 1 is a block diagram that illustrates a relationship between the rack configuration design problem 105, an encoding 108 of the problem in a language that a solver 110 can solve, to produce a solution 120. Additionally, the solver may be fed control inputs or other parameters 112 that can affect its execution. A graphical user interface (GUI) 102 (or other suitable interface) may be used to input various parameters such as the parameters for defining the design problem 105. The solution 120 may be provided to the user via GUI 102. In an embodiment, the present invention provides an optimization-based method for designing the racking and wiring configuration for pieces of hardware (such as networked devices) by expressing the racking and wiring configuration problem in an encoding 108 that uses a modeling language that an integer programming solver 110 can exploit to produce a solution 120. The method is formulated in a unique way using integer programming techniques and various methods may be used to speed up the calculation of the results, as described in detail below.

Integer programming techniques are described further in, for example, the following reference: *Integer Programming* by Laurence A. Wolsey published by John Wiley and Sons, Inc. New York, 1998, which is hereby fully incorporated herein by reference. The encoding of the problem model 105 and/or its solution method may be written in, for example, GAMS (Generalized Algebraic Modeling System) which is a high-level modeling system for mathematical programming problems. GAMS reads in problems specified in the GAMS language and communicates with the solver. The solver 110 may be CPLEX which is a collection of mathematical programming software solvers available from ILOG, Inc.

As known to those skilled in the art, in integer programming, values are chosen for variables in order to maximize or minimize an objective function, where the function is subject to constraints that are expressed mathematically. The various constraints and objectives mentioned in various embodiments of the invention may be selected or produced by use of integer programming.

Method of Designing Racking and Wiring Configurations

In one embodiment, a method of the invention will consider a set of boxes and wiring requirements (i.e., which boxes are connected). The set of boxes, racking and wiring requirements and constraints may, for example, include at least some of the following:

(1) Set of required boxes.
(2) Set of required links between boxes.
(3) Set of available rack types.
(4) Set of floor locations for racks.
(5) Attributes for each box (e.g., dimensions, power requirements, UPS requirement, cooling requirements).
(6) Attributes of each rack (e.g., dimensions, power capacity, UPS availability or capacity, cost, cooling capacity, material, bounds on link count, area, or volume that may enter or leave the rack).
(7) Attributes of each link (e.g., type, limits on length, area, weight, capacity, power, bending radius).
(8) Distances between floor locations.
(9) Other box, rack, or place-specific attributes and requirements. (Many such requirements and attributes will be apparent to those skilled in the art.)

Problem-specific constraints may also be specified, including, for example, one or more of the following:

(1) Pre-assignments (i.e., specifications of desired, existing, required or forbidden assignments of, e.g., boxes to racks or boxes that should be in the same rack).
(2) Maximum or minimum floor loadings or both.
(3) Maximum or minimum rack densities or both.
(4) A maximum total cost, floor space, and/or volume.
(5) A maximum total cable length.
(6) A maximum number or numbers of inter-rack links (possibly different limits associated with different kinds of such links).
(7) A maximum length of, or cost of, inter-rack links.
(8) Maximum cooling loads, perhaps varying across the places where racks may be put.
(9) Maximum or minimum distances between racks or both.
(10) Other problem-specific constraints. (Many such constraints will be apparent to those skilled in the art.)

In an embodiment, a method of the invention will then provide at least one of the following results.

(1) The number of instances of each available rack type which is used.
(2) The rack to which at least one box is assigned.
(3) The location to which at least one rack is assigned.
(4) The location in a rack to which at least some boxes are placed or assigned.

At least one of the following objectives (subject to constraints) may be chosen, when solving for the above results.

(1) Minimize the number of racks to be used.
(2) Minimize the total cost of racks to be used.
(3) Minimize the cost of remaining racks to be purchased, in the case where present racks can be used.
(4) Minimize the cost, length or number of inter-rack wires or links.
(5) Minimize the number of "long cables", where a long cable exceeds a pre-defined length.
(6) Minimize the height of the center of gravity of a rack.
(7) Leave space for future growth, and slots for new boxes.
(8) Maximize the number of intra-rack wires or links.
(10) Other metric(s) or criteria chosen by the user.

It is noted that some of the above objectives may be desirable because racks tend to be expensive and/or may occupy expensive or limited area in a room. Furthermore, racks may be placed in a room that is being retrofitted, and may be constrained on the available power or cooling. Additionally, some boxes and racks may have particular requirements such as uninterruptible power or specific cooling needs or may need to be in a rack with earthquake resistance features.

Additionally, some of the above constraints may be desirable because: (1) the total height or space of boxes can not exceed the limited total height or space of racks, (2) boxes that require uninterruptible power must typically be in a rack that supports adequate uninterruptible power, (3) racks must typically meet the power requirements of their boxes, (4) the total heat generated by boxes in a single rack must be within some limits (e.g., the cooling ability of the rack in a particular configuration).

Additionally, some of the above objectives may be desirable because it is typically desirable to minimize the cables that connect boxes in different racks and to minimize in particular the number of long cables that connect boxes in different racks.

Figure 2:
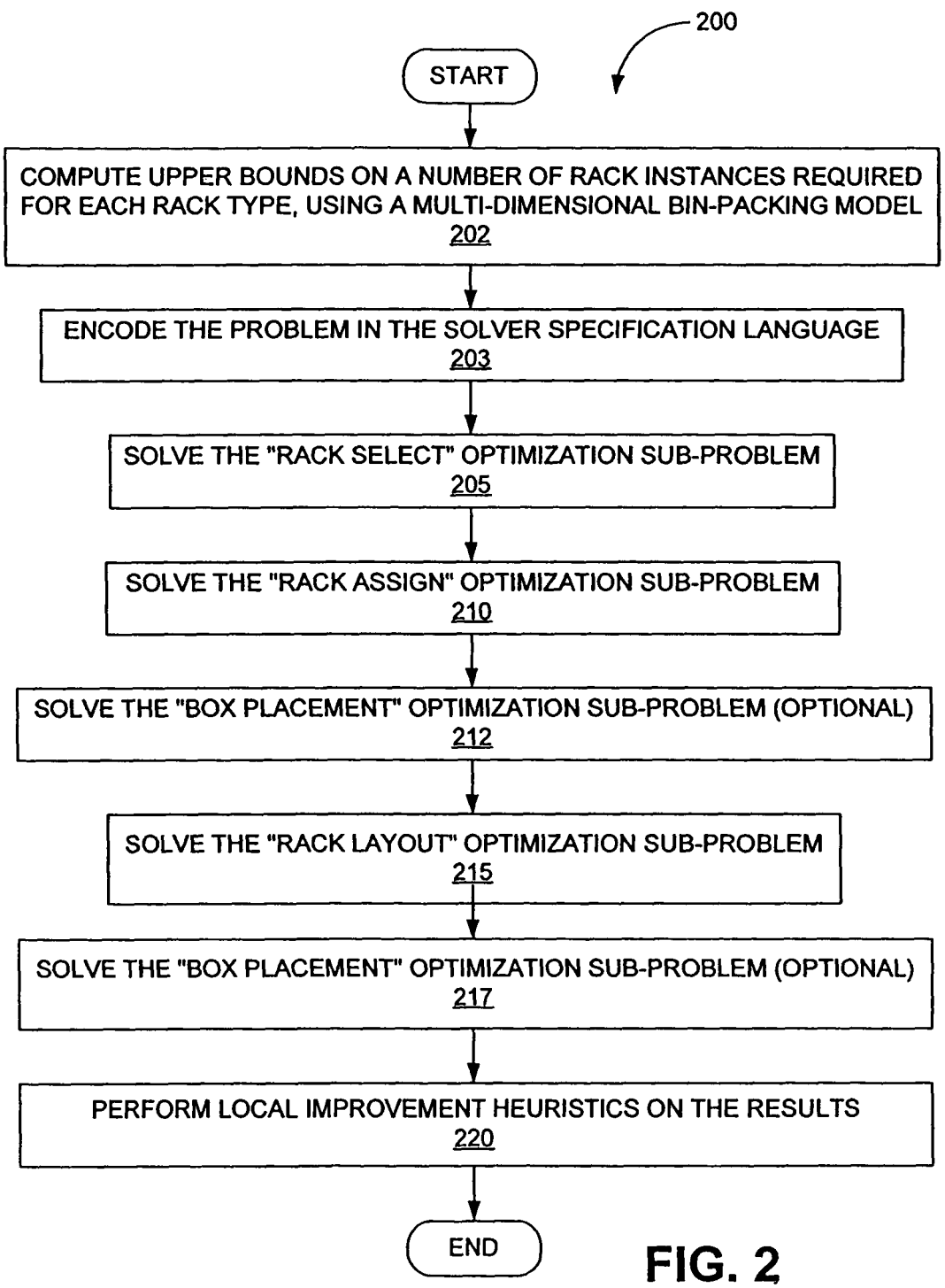
FIG. 2 is a flowchart of a method of designing the racking and wiring configuration for pieces of hardware (e.g., networked devices) by solving optimization sub-problems, in accordance with an embodiment of the invention.

FIG. 2 is a flowchart that illustrates a method 200 of designing the racking and wiring configuration for pieces of hardware or boxes (such as networked devices), in accordance with an embodiment of the invention. The method 200 permits the above results to be generated based upon a given set of inputs by solving various optimization sub-problems. The method 200 may include encoding the problem specification 105 in a form 108 that can be used by solver 110 (FIG. 1) in step 203. The method 200 may include computing (202) the upper bounds on a number of rack instances required for each rack type, e.g., by using a multi-dimensional bin-packing model, or other method, such as design by hand. The method 200 further includes solving (205) an optimization sub-problem (i.e., "rack select") to determine the particular racks to use. The method 200 then solves (210) an optimization sub-problem (i.e., "rack assign") to determine which particular rack that each box should be assigned to. The method 200 then solves (215) an optimization sub-problem (i.e., "rack layout") to determine which floor location that each loaded rack will be assigned to. Thus, in the rack layout model, the racks are treated as if they were boxes, and the floor positions are treated as if they were racks. The above optimization sub-problems are typically solved in sequence to improve execution time, in an embodiment of the invention. However, in other embodiments, any one these models may be solved individually (alone) rather than sequentially. For example, one embodiment may include solving only the rack select optimization sub-problem and using other methods to assign boxes to racks or to assign racks to physical locations. As another example, a user can use a solution of the rack select optimization sub-problem alone, if the user only wants to know which particular racks to obtain or buy. Similarly, either of the other optimization sub-problems (rack assign optimization sub-problem or rack layout optimization sub-problem) may be solved alone. As mentioned above, these optimization sub-problems may be represented as integer programming models, which may be solved using integer programming solvers. The integer program to solve the various above-mentioned sub-problems may be specified via an integer programming language.

An optional local improvement heuristic may then be selectively performed (220) on the results from the above actions (205) to (215), in order to improve the results further.

Optionally, an assignment can be made for the placement of boxes within a rack, or placement of at least one box within a rack. In FIG. 2, this optional step is denoted as the "box placement" optimization sub-problem. For example, the order of boxes within a rack can be made to achieve an objective(s) such as, for example, minimizing cable lengths and/or achieving another optimization(s). Other objectives may alternatively or additionally include, for example, weight distribution or power distribution. Other objectives may be selected.

As shown in FIG. 2, a "box placement" optimization sub-problem may be optionally solved (212) after solving the "rack assign" optimization sub-problem. Alternatively or additionally, a "box placement" optimization sub-problem may be optionally solved (217) after solving the "rack layout" optimization sub-problem. The algorithm for placing boxes in the "box placement" optimization sub-problem is similar to the below-described algorithm for placing racks within a room.

Rack Select Optimization Sub-Problem

Figure 3:
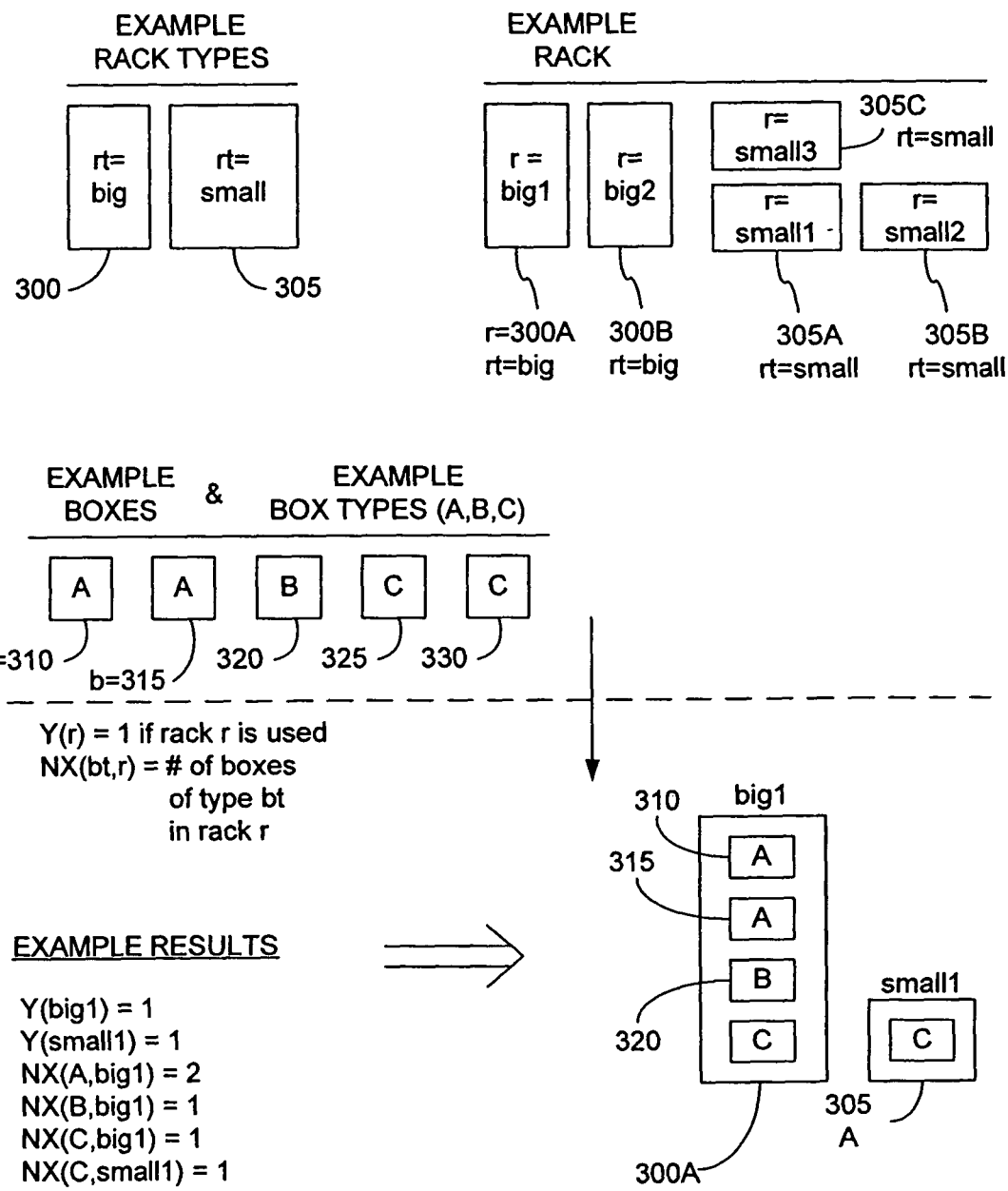
FIG. 3 is a block diagram that illustrates an example of solving the rack select optimization sub-problem, in accordance with an embodiment of the invention.

Referring now to FIG. 3, there is shown a block diagram that illustrates an example of solving the rack select optimization sub-problem, in accordance with an embodiment of the invention. This model chooses the set of racks such that all boxes fit in the chosen racks.

The constraint(s) used, for example, may include at least one of the following: (1) the total height of the boxes (i.e., pieces of hardware) to be placed in a rack does not exceed a rack height; (2) a selected rack meets power requirements for boxes placed in the selected rack; (3) boxes that require UPS are placed in a rack that supports adequate UPS; (4) the total heat generated by boxes in a single rack are within some limits; (5) rack capacity are met with respect to other measured attributes of the boxes (besides power, UPS, cooling, and size attributes); (6) certain box type and rack type combinations may be prohibited; (7) a box and a backup of the box are placed in separate racks; (8) a box and a backup of the box are separated by at least some user-defined distance; and (9) a box is assigned to a compatible rack. Other alternative or additional constraints may be selected. A backup of a box is defined as a box that is meant to be the backup for others and that if the original box fails, then the backup box is meant to take over the function of the failing box. The above constraints can be selectively designated in the problem representation 108 (see FIG. 1), may be defined by an objective function in the solver 110, or provided as a control parameter or parameters to the solver 112, or some combination of these.

The objective may be, for example, one of the following: (1) to minimize the total cost of selected racks; (2) to minimize the total number of selected racks; (3) to minimize the cost of racks not yet purchased (or not yet owned); (4) to minimize floor space needs; (5) to minimize power requirements; (6) to balance cooling requirements; and/or (7) to use a single rack type. Other alternatives or additional objectives may be selected. The objectives may be input in the encoded problem specification 108 (FIG. 1), may be defined by an objective function in the solver 110, or provided as a control parameter or parameters to the solver 112, or some combination of these.

In the example of FIG. 3, assume that there are two types (rt) of possible racks to choose from, namely a big-type rack (generally represented by rack 300 where rt=big) and a small-type rack (generally represented by rack 305 where rt=small). It is noted that other types (rt) of possible racks may be defined, such as, for example, blue-colored or other colored racks, wood racks, metal racks, different brand racks, and the like. The rack width may also be defined, although rack width tends to be standard. Furthermore, some types of possible racks may be differ in cost, as well as in their limitations on power supply capability, UPS capability, cooling capability, and/or other physical attributes. The different rack types may be input in the encoded problem specification 108 (FIG. 1), may be pre-defined in the solver 110, or provided as a control parameter or parameters to the solver 112, or some combination of these.

Assume that in the example of FIG. 3, the following racks (r) may be selected as shown in Table 1. The number and type of selectable racks r may vary in other examples.

TABLE 1

| Rack r | rack type (rt) |
|---|---|
| r = big1 (also referenced as rack 300a) | rt = big |
| r = big2 (also referenced as rack 300b) | rt = big |
| r = small1 (also referenced as rack 305a) | rt = small |
| r = small2 (also referenced as rack 305b) | rt = small |
| r = small3 (also referenced as rack 305c) | rt = small |

Assume further that a box type is defined as "bt" and that there are type A, B, C, and D boxes. Box type bt can be, for example, related to physical attribute(s) such as functionality (i.e., switch, hub, disk array, server, and/or the like), size, shape, color, power requirement, cooling requirement, UPS requirement, and/or other physical attributes. Assume further that the following boxes have the corresponding box type bt as shown in Table 2. The number of boxes and box types bt may vary in other examples.

TABLE 2

| Box (b) | Box type (bt) |
|---|---|
| 310 | A |
| 315 | A |
| 320 | B |
| 325 | C |
| 330 | C |

Assume the following decision variables are used in the solution approach for the rack select optimization sub-problem, as shown in equations (1a), (1b), and (1c):

Decision Variables $Y(r)=1$ if rack $r$ is used to hold one or more boxes  (Eq. 1a), $Y(r)=0$ if rack $r$ is not used to hold a box  (Eq. 1b), $NX(bt,r)$=number of boxes of type $bt$ placed in rack $r$  (Eq. 1c), where Y is a binary variable and NX is a general integer variable with upper bounds pre-computed based on the measurement attributes of bt and rt and on the number of available boxes of type bt, whichever is most binding.

Table 3 lists one possible (though not unique) solution for Equations (1a) to (1c) where the results from the decision variables in the integer program indicate that rack big1 (300a) will hold two type A boxes (i.e., boxes 310 and 315), one type B box (i.e., box 320), and a type C box (may be box 325 or box 330), that rack small1 will hold a type C box (may be box 325 or box 330), and that rack big2, rack small2, and rack small3 will be unused (will not hold any of the boxes). The results are obtained based on the constraint(s) and objective(s) that are specified, for example, in the problem representation 108 (FIG. 1). Thus, the results may vary, depending on the particular selected constraint(s) and objective(s). It is further noted that that the solver for the rack assign optimization sub-problem (discussed in detail below) can determine which particular type C box (box 325 or box 330) will be placed into rack big1 and into rack big2.

TABLE 3

Results corresponding to the example of FIG. 3

Y(r) = 1 if rack r is used to hold one or more boxes (Eq. 1a).
Y(r) = 0 if rack r is not used to hold a box (Eq. 1b).

Y(big1) = 1, since rack big1 will hold the various boxes (two type A boxes, one type B box, and one type C box) in the example of FIG. 3;
Y(big2) = 0, since rack big1 will not hold a box in the example of FIG. 3;
Y(small1) = 1, since rack small1 will hold a type C box in the example of FIG. 3;
Y(small2) = 0, since rack small2 will not hold a box in the example of FIG. 3;
Y(small3) = 0, since rack small3 will not hold a box in the example of FIG. 3;
NX(bt, r) = # of boxes of type bt placed in rack r (eq. 1c).

NX(A, big1) = 2, since rack big1 will hold two type A boxes (i.e., boxes 310 and 315) in the example of FIG. 3;
NX(B, big1) = 1, since rack big1 will hold one type B box (i.e., box 320) in the example of FIG. 3;
NX(C, big1) = 1, since rack big1 will hold one type C box (i.e., may be box 325 or box 330) in the example of FIG. 3;
NX(C, small1) = 1, since rack small1 will hold one type C box (i.e., may be box 325 or box 330) in the example of FIG. 3;
NX(A, big2) = 0, since rack big2 will not hold a type A box in the example of FIG. 3;
NX(B, big2) = 0, since rack big2 will not hold a type B box in the example of FIG. 3;
NX(C, big2) = 0, since rack big2 will not hold a type C box in the example of FIG. 3;
NX(A, small1) = 0, since rack small1 will not hold a type A box in the example of FIG. 3;
NX(B, small1) = 0, since rack small1 will not hold a type B box in the example of FIG. 3;
NX(A, small2) = 0, since rack small2 will not hold a type A box in the example of FIG. 3;
NX(B, small2) = 0, since rack small2 will not hold a type B box in the example of FIG. 3;
NX(C, small2) = 0, since rack small2 will not hold a type C box in the example of FIG. 3;
NX(A, small3) = 0, since rack small3 will not hold a type A box in the example of FIG. 3;
NX(B, small3) = 0, since rack small3 will not hold a type B box in the example of FIG. 3;

TABLE 3-continued

Results corresponding to the example of FIG. 3

NX(C, small3) = 0, since rack small3 will not hold a type C box in the example of FIG. 3.

Table 4 lists example mathematical expressions for the rack select optimization sub-problem, where the selected objective is to minimize the cost of selected racks. It is noted that these expressions are not limiting to the scope of embodiments of the invention and that the mathematical expressions may differ based on the selected objective(s) and/or selected constraint(s).

TABLE 4

Mathematical Expressions for the Rack Select optimization sub-problem
Let [k] denote the set $\{1, \ldots, k\}$ throughout.
For Rack Select, the inputs are
    Set RT of rack types.
    Set BT of box types.
    Set ATT of attributes of box types.
    Parameters cap(rt, att) and req(bt, att) for capacities
and requirements of each $bt \in BT$ and $rt \in RT$ for an attribute $att \in ATT$.
    Cost cost(rt) of each rack type rt.
    The maximum number of instances needed for each rack type MN(rt).
    Number of boxes of each type NB(bt).
Decision variables are
    Indicator variable for whether each rack is used, Y(rt, rn), $rt \in RT$, $rn \in [MN(rt)]$. The variable Y(rt, rn) equals 1 when at least one component is placed in instance rn of rack type rt and equals 0 otherwise.
    The number of boxes assigned to each rack NBA (bt, rt, rn), $bt \in BT$, $rt \in RT$, $rn \in [MN(rt)]$. This must be a non-negative integer.
If we are minimizing the cost of racks used the objective is
    Minimize $\Sigma$    cost(rt) * Y(rt, rn)
        $rt \in RT$, $rn \in [MN(rt)]$
Other objectives are possible.
A preferred embodiment of the invention uses the following constraints. Some are optional, while similar constraints can be added while remaining in the scope of embodiments of the invention.
    Assign each box to some rack,
        $\Sigma$          NBA(bt, rt, rn) = NB(bt), $bt \in BT$.
    $rt \in RT$, $rn \in [MN(rt)]$
    where rt represents the rack type and rn represents the index of an instance of that rack type.
    Do not use any rack unless it is paid for,
        NBA(bt, rt, rn) $\leq$ Y(rt, rn) * NB(bt),
    for $bt \in BT$, $rt \in RT$, $rn \in [MN(rt)]$.
    Obey rack capacities,
        $\Sigma$          NBA(bt, rt, rn) * req(bt, att) $\leq$ cap(rt)
    $bt \in BT$
    for $att \in ATT$, $rt \in RT$, $rn \in [MN(rt)]$.
    Anti-symmetry constraints on racks,
        Y(rt, rn + 1) $\geq$ Y(rt, rn),
    $rt \in RT$, $rn \in [MN(rt) - 1]$.
    One can forbid certain box types from appearing in given rack types. The constraint would be
        NBA(bt, rt, rn) = 0, $rn \in [MN(rt)]$
for given pairs (bt, rt) with $bt \in BT$ and $rt \in RT$.

Rack Assign Optimization Sub-Problem

As noted in the example of FIG. 3, the rack big1 (300a) will hold a type C box (may be box 325 or box 330), and the rack small1 will hold a type C box (may be box 325 or box 330). The rack assign optimization sub-problem is that of determining to which rack a box will be assigned, preferably for each box in the problem specification. Thus, the rack assign optimization sub-problem solver can determine which particular type C box (box 325 or box 330) will be placed into rack big1 and into rack big2 in the above example.

The rack assign optimization sub-problem solver will typically consider constraints and objectives such as, for example, at least one of the following selectable constraint(s) and objective(s): (1) minimize the total wire or link length; (2) minimize the total number of inter-rack links or wires; (3) minimize the number of wires or links exceeding a defined length; (4) minimize the total length of inter-rack wires or links; (5) minimize the cost of inter-rack wires or links; (6) minimize the number of wires or links crossing between machine rooms, domains, and/or buildings; (6) minimize the height of the center of gravity of a rack; (7) leave space for future growth, and slots for new boxes; (8) maximize the number of intra-rack wires or links; (9) assign each box to a rack; and/or (10) other selectable constraints.

Additionally, other constraints may be selected, such as, requiring a particular box b to be placed in a particular rack r, or requiring that a particular box b can not be placed in a particular rack r. These different constraint(s) and objective(s) may be input in the encoded problem specification 108 (FIG. 1), may be pre-defined in the solver 110, or provided as a control parameter or parameters to the solver 112, or some combination of these. These are forced decisions that the user can specify, in order to speed up the integer program calculation or to ensure the user's preferences are honored or both.

Figure 4:
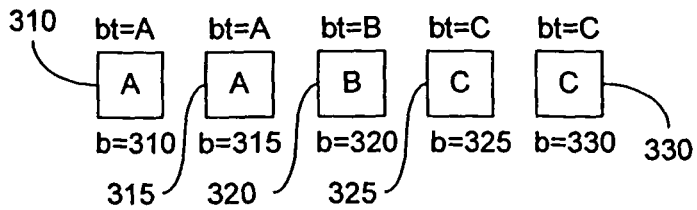
FIG. 4 is a block diagram that illustrates an example of solving the rack assign optimization sub-problem, in accordance with an embodiment of the invention.
Figure 4:
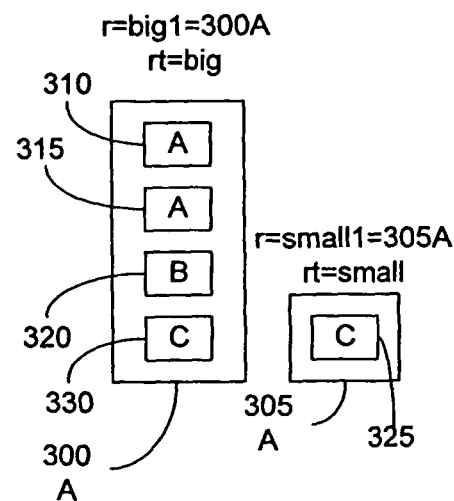

It is noted that the problem specification 105 includes (implicitly or explicitly) the physical attributes of a box type bt. Each type C box has the same physical attributes. As shown in FIG. 4, the type C boxes 325 and 330 will have the same physical attributes.

The problem specification 105 and its encoding 108 also includes (implicitly or explicitly) the individual box wiring layout requirements. For example, type C box 330 may require more wiring connection than type C box 325, depending upon, for example, the wiring layout or the function to be performed by the box.

Assume that the following decision variables are used in the rack assign optimization sub-problem solver, as shown in equations (2a), (2b), and (2c):

Decision Variables (Eq. 2a)

$X(b, r) = 1$ if box $b$ is assigned to rack $r$, $X(b, r) = 0$ if box $b$ is not assigned to rack $r$, (Eq. 2b)

$Z(a, r, b, s) = 1$ if box $a$ is assigned to rack $r$ (Eq. 2c)
AND
box $b$ is assigned to rack $s$ =
  quadratic term $X(a, r) * X(b, s) (r \neq s)$, where (r,s)=racks (rack instances) and (a,b)=boxes (box instances), and where X is a binary variable, and where Z can take on values of zero (0) or one (1). As discussed below, Z can be treated as a continuous variable in order to speed up the calculation process. Also, Z(a,r,b,s) is defined only if components a and b are linked.

Table 5 lists the results for Equations (2a) to (2c) where the results from the decision variables in the integer program indicate that rack big1 (300*a*) will hold box 310, box 315, box 320), and the type C box 330, and that rack small1 will hold the type C box 325. The results are obtained based on the constraint(s) and objective(s) that are selected for execution in the solver 110 (FIG. 1). Thus, the results may vary, depending on the particular selected constraint(s) and objective(s).

TABLE 5

Results corresponding to the example of FIG. 4

$X(b, r) = 1$ if box b is assigned to rack r (Eq. 2a),
$X(b, r) = 0$ if box b is not assigned to rack r (Eq. 2b), $X(310, big1) = 1$
$X(310, big2) = 0$
$X(310, small1) = 0$
$X(310, small2) = 0$
$X(310, small3) = 0$
$X(315, big1) = 1$
.
.
.
$X(320, big1) = 1$
.
.
.
other values for the above equations will be zero (0).
$Z(a, r, b, s) = 1$ if box a is assigned to rack r AND
box b is assigned to rack s
= quadratic term $X(a, r) * X(b, s) (r \neq s)$ (Eq. 2c),
Others will be one. For example $Z(310, big1, 315, big1) = 1$.
$Z(330, big1, 325, small1) = 1$
$Z(330, big1, 310, small1) = 0$
.
.
.
other values for the above equation will be zero (0).

It is further noted that in the example of FIG. 4, typically data indicating existing link instances are also considered in the quadratic term Z( ). The number of existing link instances can vary. Thus, the Z(a,r,b,s) variables exist only when link (a,b)>0 and r<>s. Thus, for purposes of describing a functionality of embodiments of the invention, the example of FIG. 4 only shows a subset of existing variables that are considered in the quadratic term Z( ).

Table 6 lists examples of mathematical expressions for the rack assign optimization sub-problem, where the selected objective is to minimize the cost of inter-rack wires. It is noted that these expressions are not limited to the scope of embodiments of the invention and that the mathematical expressions may differ based on the selected objective(s) and/or selected constraint(s).

TABLE 6

Mathematical Expressions for the rack assign optimization sub-problem
For Rack Assign, the inputs are
    The inputs to Rack Select.
    The NBA values chosen in Rack Select.
    Set of box instances BI.
    A distance between rack instances $dist(rt_1, rn_1, rt_2, rn_2)$
    where $rt_1, rt_2 \in RT$, $rn_1 \in [MN(rt_1)]$ and $rn_2 \in [MN(rt_2)]$.
    The number of cables $cables(bi_1, bi_2)$ between two box
instances $bi_1, bi_2 \in BI$.
    Indicator variables force(bi, rt, rn) and forbid(bi, rt,
rn) which are 1 when the box instance is bi required or
forbidden to be in rack(rt, rn), $rt \in RT$, $rn \in [MN(rt)]$.
For Rack Assign, the outputs are
    An indicator variable X(bi, rt, rn) which is 1 when box bi
is assigned to rack(rt, rn) and is 0 otherwise, $bi \in BI$, $rt \in$
RT, $rn \in [MN(rt)]$.
    An indicator variable $Z(bi_1, rt_1, rn_1, bi_2, rt_2, rn_2)$ which
is 1 when box $bi_1$ is assigned to $rack(rt_1, rn_1)$ and box $bi_2$ is
assigned to $rack(rt_2, rn_2)$ and is 0 otherwise, $bi_1, bi_2 \in BI$,
$rt_1, rt_2 \in RT$, $rn_1 \in [MN(rt_1)]$ and $rn_2 \in [MN(rt_2)]$.
An example objective is
    Minimize
    Σ     $cables(bi_1, bi_2) * dist(rt_1, rn_1, rt_2, rn_2)$
$bi_1, bi_2 \in BI$, $rt_1, rt_2 \in RT * Z(bi_1, rt_1, rn_1, bi_2, rt_2, rn_2)$
$rn_1 \in [MN(rt_1)], rn_2 \in [MN(rt_2)]$
which minimizes the total length of inter-rack cables.

TABLE 6-continued

A preferred embodiment uses the following constraints. Some are optional, while similar constraints can be added while remaining within the scope of embodiments of this invention.

Only use racks used in the solution of Rack Select:
$X(bi, rt, rn) = 0$
for all $bi \in BI$ if $Y(rt, rn) = 0$ in Rack Select.

Rack capacities need to be respected:
$\sum_{bi \in BI} req(bi, att) * X(bi, rt, rn) \leq cap(rt, att)$ for $rt \in RT$, $rn \in [MN(rt)]$ and $att \in ATT$. The term req(bi, att) represents the amount of attribute att used by box instance bi.

Use at least an $\alpha$ fraction of the resources of each rack used in Rack Select where $\alpha = 0.85$ in one embodiment:
$\sum_{bi \in BI} req(bi, att) * X(bi, rt, rn)$
$\geq$
$\alpha \sum_{bt \in BT} req(bt, att) * NBA(bt, rt, rn),$ for $rt \in RT$, $rn \in [MN(rt)]$ and $att \in ATT$. This constraint, like others, is optional and can be either left out or made trivially satisfied by setting $\alpha = 0$.

Observe the force and forbid constraints:
$force(bi, rt, rn) = 1 \$\$ X(bi, rt, rn) = 1$
and
$forbid(bi, rt, rn) = 1 \$\$ X(bi, rt, rn) = 1$
for $bi \in BI$, $rt \in RT$, $rn \in [MN(rt)]$.

Logic relating X and Z variables:
$X(bi_1, rt_1, rn_1) + X(bi_2, rt_2, rn_2) \leq Z(bi_1, rt_1, rn_1, bi_2, rt_2, rn_2) + 1$
for $bi_1, bi_2 \in BI$, $rt_1, rt_2 \in RT$, $rn_1 \in [MN(rt_1)]$ and $rn_2 \in [MN(rt_2)]$.

Place "about" the same number of boxes into each rack as "Rack Select" did:
$[(1 - \beta)NBA(bt, rt, ri)] \leq \sum_{bi \in BI} X(bi, rt, rn) \leq [(1 + \beta)NBA(bt, rt, ri)]$
for $bt \in BT$, $rt \in RT$ and $rn \in [MN(rt)]$. The $\beta$ is a parameter; $\beta$ is equal to 0.2 in one embodiment of the invention.

Rack Layout Optimization Sub-Problem

The rack layout optimization sub-problem is to determine the floor position and ordering of the racks r. In the solution model for this sub-problem, the racks are treated as if they were boxes, and the floor positions are treated as if they were racks. Thus, the rack layout optimization model uses the same approach as the rack assign optimization model and in at least one embodiment is treated as a case of the rack assign optimization sub-problem.

The rack layout optimization model will typically consider constraints and objectives, such as, for example, at least one of the following selectable constraint(s) and objective(s): (1) minimize the total link or wire length; (2) minimize the total number of inter-rack links or wires; (3) minimize the number of links or wires exceeding a defined length; (4) minimize the total length of inter-rack links or wires; (5) minimize the cost of inter-rack links; (6) minimize the number of links or wires crossing between machine rooms, domains, and/or buildings; (7) minimize floor space needs; (8) minimize power requirements; (9) to balance cooling requirements; and/or (10) other selectable constraints. These different constraint(s) and objective(s) may be input in the encoded problem specification 108 (FIG. 1), may be pre-defined in the solver 110, or provided as a control parameter or parameters to the solver 112, or some combination of these.

Assume the following decision variables are used in the rack layout optimization model, as shown in equations (3a), (3b), and (3c):

Decision Variables (Eq. 3a)
$X(r, L) = 1$ if rack $r$ is assigned to location $L$, $X(r, L) = 0$ if rack $r$ is not assigned to location $L$, (Eq. 3b)

$Z(r, L, s, M) = 1$ if rack $r$ is assigned to location $L$ (Eq. 3c)
AND
rack $s$ is assigned to location $M$ =
quadratic term $X(r, L) * X(s, M) (L \neq M)$ where r and s are selected rack instances for holding boxes and (L,M)=locations (location instances), and where X is a binary variable, and where Z can take on values of zero (0) or one (1). As discussed below, Z can be treated as a continuous variable in order to speed up the calculation process. Z(r,L,s,M) should be defined only if the components r and s are linked.

Table 7 lists the results for Equations (3a) to (3c) where the results from the decision variables in the integer program indicate that rack 500 will be in location 530, rack 505 will be in location 535, racks 510 and 515 will be in location 540, and rack 520 will be in location 545. The results are obtained based on the constraint(s) and objective that are selected for execution in the solver 110 (FIG. 1). Thus, the results may vary, depending on the particular selected constraint(s) and objective(s).

TABLE 7

Figure 5:
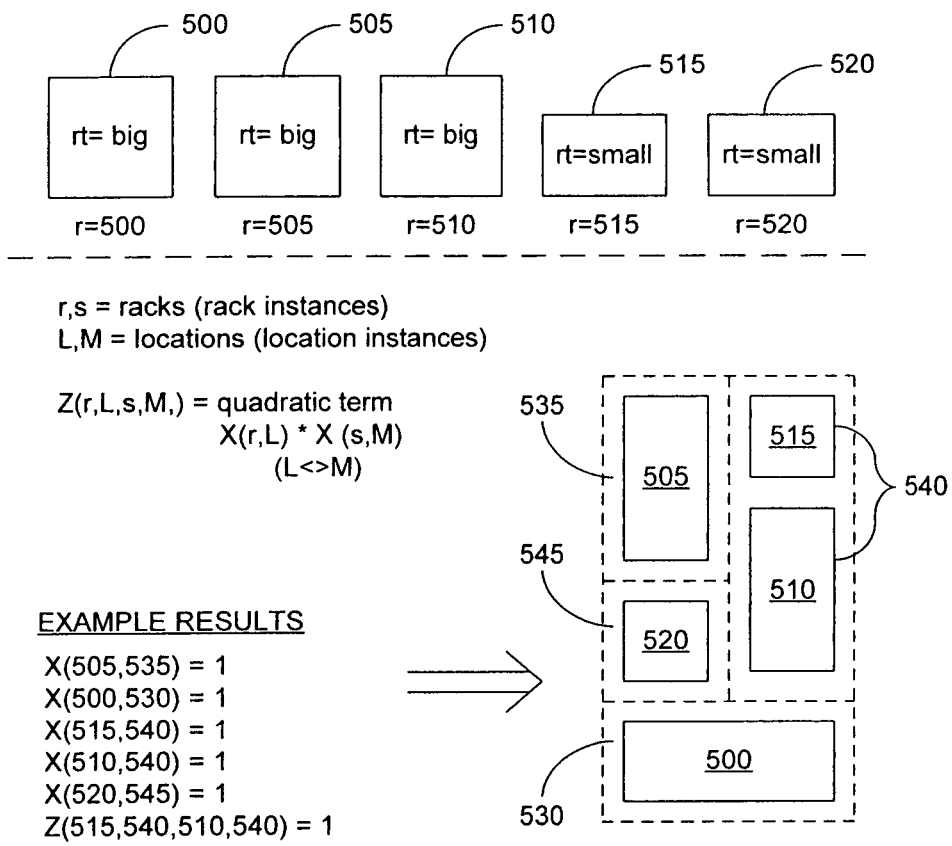
FIG. 5 is a block diagram that illustrates an example of solving the rack layout optimization sub-problem, in accordance with an embodiment of the invention.

Results corresponding to the example of FIG. 5

$X(r, L) = 1$ if rack r is assigned to location L (Eq. 3a),
$X(r, L) = 0$ if rack r is not assigned to location L (Eq. 3b), $X(505, 535) = 1$
$X(500, 530) = 1$
$X(515, 540) = 1$
$X(520, 545) = 1$
$X(505, 530) = 0$
$X(505, 540) = 0$
.
.
.
other values for the above equations will be zero (0).
$Z(r, L, s, M) = $ quadratic term $X(r, L) * X(s, M) (L \neq M)$ (Eq. 3c), $Z(515, 540, 510, 540) = 1$
$Z(515, 530, 510, 540) = 0$
.
.
.
other values for the above equation will be zero (0).

It is further noted that in the example of FIG. 5, typically data indicating existing link instances are also considered in the quadratic term Z( ). The number of existing link instances can vary. Thus, the Z(r,L,s,M) variables exist only when link (r,s)>0 and L<>M. Thus, for purposes of describing a functionality of embodiments of the invention, the example of FIG. 5 only shows a subset of existing variables that are considered in the quadratic term Z( ).

The parameters r and s are boxes. Z(r,L,s,M) is defined only when boxes r and s are connected by one or more links.

Perform a Final Local Search to Improve the Solution

Since the above optimization models are solved sequentially, a less than optimal result (solution) may possibly be obtained for the objective than if the above models are solved concurrently. A final local search may be performed to improve the result (solution) for the objective. This is a heuristic-based approach where, for example, a box may be moved to a different rack to determine if the objective improves. As another example, the locations of two boxes may be swapped (within a rack or between racks) to determine if the objective improves. As another example, a box with many wiring connections may be moved to a centrally-located rack or to other racks. As another example, a rack may be moved to another location to determine if the objective improves. As another example, a pair of racks may be swapped in locations to determine if the objective improves. Other possible methods may be used in this step of performing the final local search to determine a better solution that improves the objective. The method or methods to use can be described in the encoded problem specification 108, embedded in the implementation of solver 110, or provided to the solver 110 through the control parameters 112, or some combination of these.

Methods for Limiting the Search Space to Speed Up the Integer Program Solution Calculation (a) Use a Fraction of a Given Constraint (Method of Using a Bin-Packing Bound)

A method to speed up the calculation for the solution in the solver 110 (FIG. 1) is to use a multidimensional bin-packing heuristic method. By applying such a method, one can obtain two benefits: first, the bin-packing method provides an initial solution to the problem 105, and second, it provides bounds on the numbers of racks of each type that would be required by the rack select optimization model. Since integer programs often require significant time in finding an initial feasible solution, using the bin-packing heuristic to generate an initial solution may speed up the solver. In addition, having bounds on the numbers of racks of each type reduces the size of the solution space that must be searched by the solver, and hence reduces the solution time. The bin-packing algorithm used can be described in the encoded problem specification 108, embedded in the implementation of solver 110, or provided to the solver 110 through the control parameters 112, or some combination of these.

Figure 6:
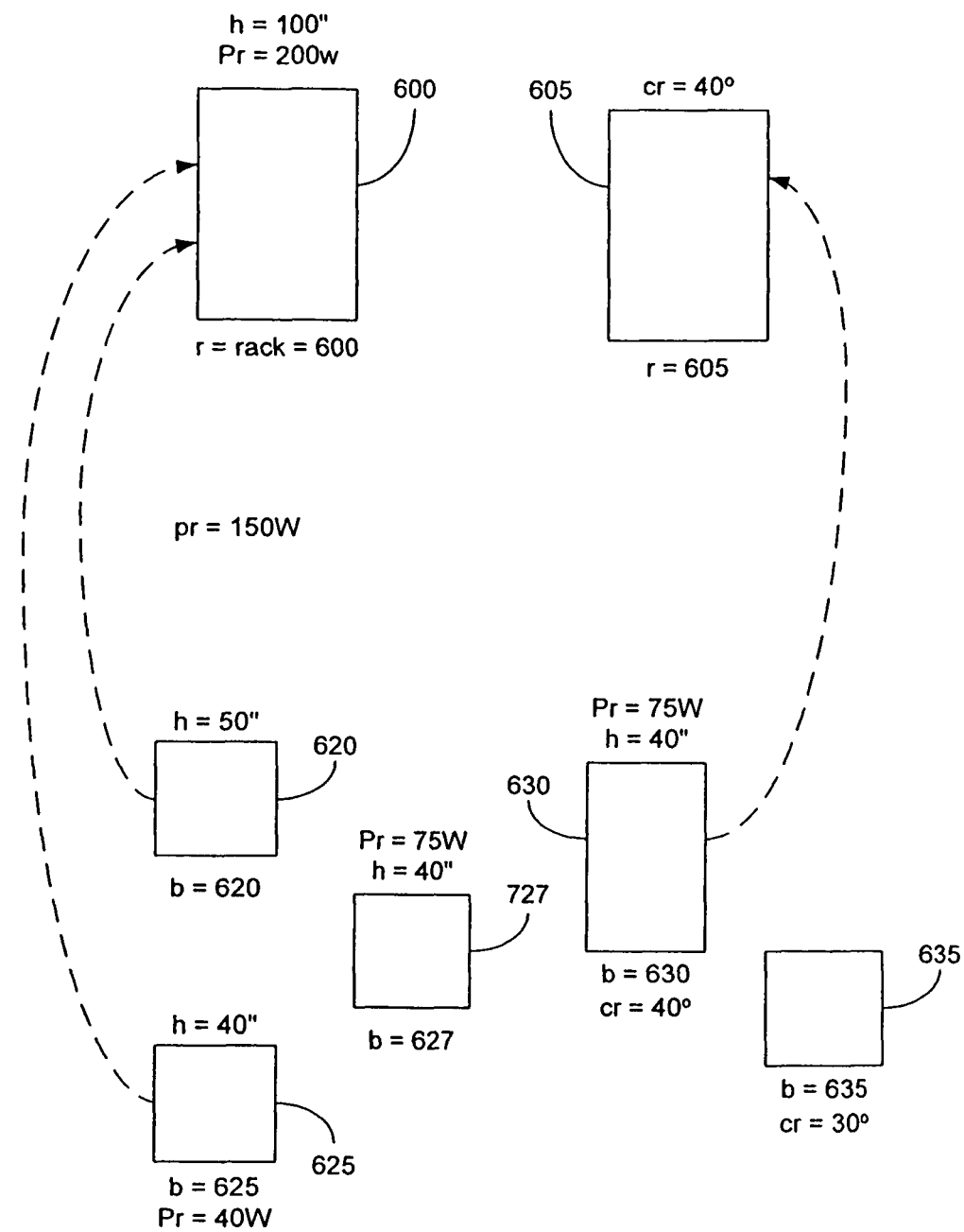
FIG. 6 is a block diagram that illustrates an example of using a bin-packing bound to speed up the solution calculation, in accordance with an embodiment of the invention.

One such multidimensional heuristic bin-packing method is a first-fit bin-packing method. This method considers the boxes in any chosen order. It considers each box in sequence and assigns the box to the first rack in which it fits with respect to all of the rack's constraints. For example, in FIG. 6 assume that rack 600 has a height of 100 inches and power supply capability of pr=200 Watts. Assume that box 620 has a height of 50 inches and power requirement pr=150 Watts. Assume that box 625 has a height of 40 inches and power requirement pr=40 Watts. Assume that box 627 has a height of 40 inches and power requirement pr=75 Watts. If box 620 is first placed in the rack 600, then box 627 will not be placed in the rack 600, since the power requirements of boxes 620 and 627 (pr=150W+75W=225W) exceeds the power supply capability (pr=200W) of the rack 600. However, the box 625 can be placed in the rack 600, since the power requirement of boxes 620 and 625 (pr=190W=150W+40W) is less than the power supply capability of the rack 600.

As another example, assume that the rack 605 has a temperature reduction capability of 40 degrees. The box 630 can fit in the rack 605, since the box 630 has a cooling requirement of 40 degrees. On the other hand, the box 635 will not fit in the rack 605, since the box 635 has a cooling requirement of 30 degrees.

The order in which the boxes are considered can vary. In one embodiment, one might order the boxes according to a particular attribute such as height or power consumption. In other embodiments, different orderings, such as a random ordering, or several different random orderings, may be considered, and one of these selected for further consideration.

The choice of order to use can be described in the encoded problem specification 108, embedded in the implementation of solver 110, or provided to the solver 110 through the control parameters 112, or some combination of these.

Thus, in an embodiment, a method to speed up the calculation for the solution in the rack select optimization sub-problem includes finding upper bounds on the required numbers of racks of each type. The solution of the integer program is sped up by considering only those solutions that adhere to the bounds. Thus, this method includes calculating bounds on the maximum number of each rack type to be used in a solution, and considering only those solutions adhering to the bounds. The upper bounds are found by performing bin-packing, or some other method, such as manual design. The upper bounds need not be tight upper bounds, although the tighter they are, the fewer alternative designs will need to be considered, and the faster the solver will run.

In another embodiment, the cost of the bin-packing solution is used to bound the integer program objective. In other words, solving the rack select optimization sub-problem includes using a cost obtained from the bin-packing method.

(b) Force a Certain Assignment(s) (or Requirement(s)) to Speed Up the Calculation As mentioned above, the user can force a certain assignment(s), or require other specification requirement(s), in an attempt to speed up the integer program calculation. In other words, this method involves forcing of at least one requirement related to a box appearing in a given rack instance (r) in order to increase the solution calculation speed for the rack assign optimization sub-problem. These forced assignments may include, but are not limited to, for example, requiring a particular box b to be placed in a particular rack r, requiring that a particular box b can not be placed in a particular rack r, and/or requiring a certain number and/or types of racks to be used. This forced assignment may also be used to indicate the presence of existing, placed, mounted or assigned boxes and racks; such existing placements can be provided in order to minimize the amount of physical re-arrangements required by the solution, as well as in order to speed up the solver.

Figure 7:
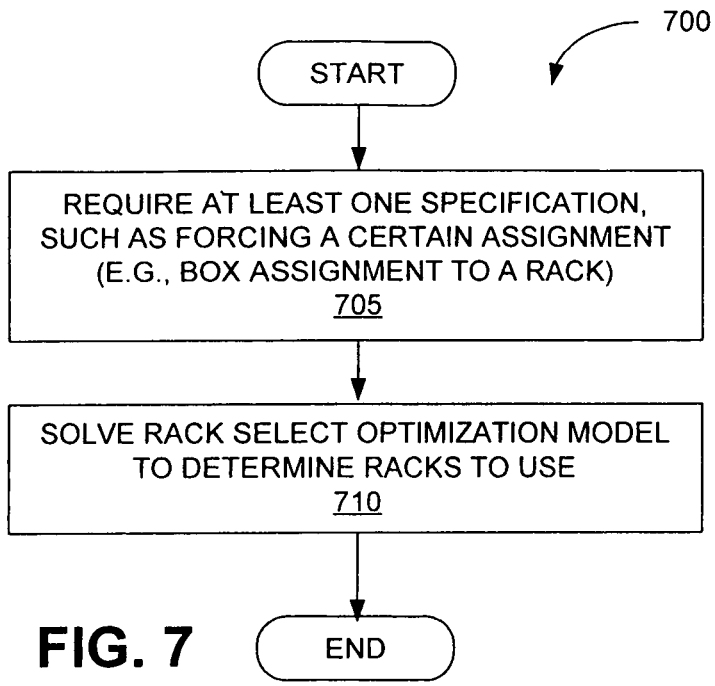
FIG. 7 is a flowchart of method of forcing specifications in the rack select optimization sub-problem, in accordance with an embodiment of the invention.

As shown in the flowchart in FIG. 7, a method 700 for forcing a certain assignment includes requiring (705) at least one specification (i.e., forcing of at least one requirement related to a box appearing in a given rack instance, such as forcing a certain assignment). For example, action (705) may include forcing a box assignment to a particular rack. The method then solves (710) the rack select optimization sub-problem to determine the racks to use. The algorithm for forcing a certain assignment(s) (or requirement(s)) to speed up the calculation can be described in the encoded problem specification 108, embedded in the implementation of solver 110, or provided to the solver 110 through the control parameters 112, or some combination of these.

(c) Allow the Variables in the Quadratic Term Z( ) to be Continuous

By permitting the variables in the quadratic term Z( ) (see above equations 2c and 3c) to be continuous, the integer program will be able to speed up the calculation for the results. This method of relaxing the integrality constraints by making the Z( ) variables be continuous is advantageous for faster calculations.

Figure 8:
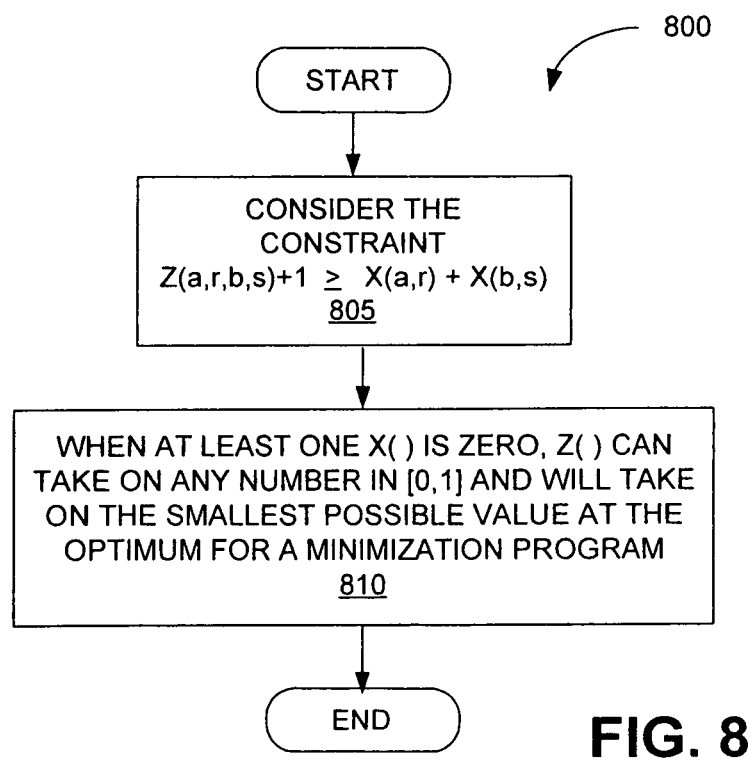
FIG. 8 is a block diagram of a method to allow the variables in the quadratic variables Z( ) to be continuous, in accordance with an embodiment of the rack assign optimization method of the invention.

As shown in the method 800 in FIG. 8, one of the constraints is $Z(a,r,b,s)+1 \geq X(a,r)+X(b,s)$ (see action (805)). As a result, if both X terms, $X(a,r)$ and $X(b,s)$, are 1 then Z is forced to be $\geq 1$. In fact Z will equal 1 if its range is [0, 1]. When at least one X is zero, Z can take on any number in [0,1] (see action (810)). However, because this is a minimization program and all Zs have positive coefficient, Z will take on the smallest possible value, 0, at the optimum. The algorithm for allowing continuous variables in the quadratic term Z( ) can be described in the encoded problem specification 108, embedded in the implementation of solver 110, or provided to the solver 110 through the control parameters 112, or some combination of these.

(d) Use an Anti-Symmetry Constraint

As noted in equation (1a) above, Y(r)=1 if rack r is used to hold a box. In an embodiment of the invention, a method of using anti-symmetry constraints advantageously eliminates or reduces the number of identical solutions to the rack select optimization sub-problem. In this context, term "symmetry" is defined as equal (or nearly equal) load or equal (or substantially equal) objective. Anti-symmetry constraints are used in integer programs to reduce a set of functionally equivalent, redundant solutions to a single solution.

Figure 9:
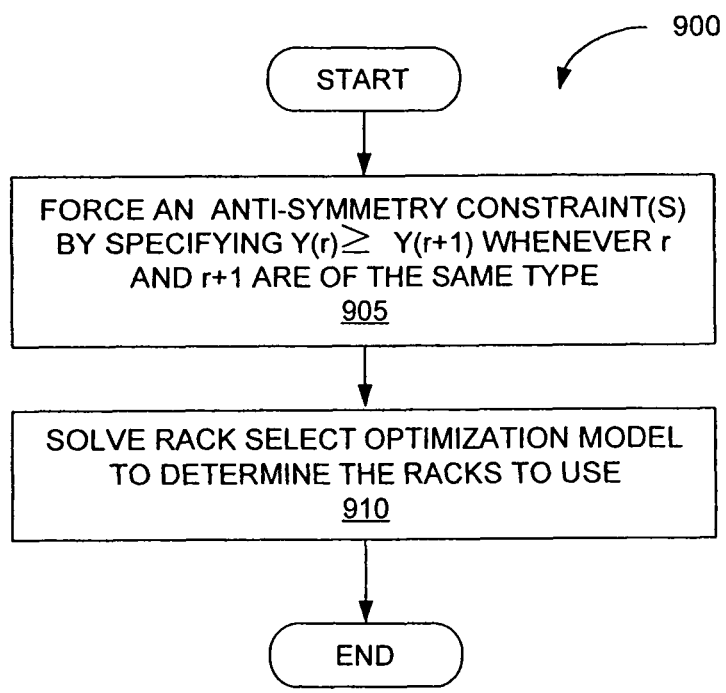
FIG. 9 is a flowchart of a method of using an anti-symmetry constraint, in accordance with an embodiment of the invention.

As shown in the flowchart in FIG. 9, a method 900 for forcing an anti-symmetry constraint(s) includes forcing (905) an anti-symmetry constraint. For example, by specifying Y(r) ≥Y(r+1), then a particular rack instance r will be required to be used before designating for use a second rack instance r+1. In action (905), prior to designating the rack r, all racks may be considered, all but a particular rack r=R may be considered, all but racks r=(R,R+1) may be considered, or other combinations may be considered or not considered. The method 900 then solves (910) the rack select optimization sub-problem to determine the racks to use. It is noted that for FIG. 9, the anti-symmetry constraint applies only if the two racks in the constraint are of the same type. We can fix this either by using two indices (rack type, instance number) as in, for example, the GAMS code, or we can just add the phrase "if rack r and rack r+1 are of the same type". In action (905), Y(r )>=Y(r+1) whenever racks r and r+1 are of the same type.

The addition of these constraints ensures that a logical distinction among identical racks, and attempts to reduce the set of functionally equivalent solutions. For example, suppose we have the option of using two racks of the same type. Obviously, given an assignment of boxes to racks, one can swap the contents of these two racks and get another solution. All such solutions will be considered by the solver. Therefore, constraints are added to cut down on the number of equivalent solutions that will be considered.

The algorithm for using an anti-symmetry constraint can be described in the encoded problem specification 108, embedded in the implementation of solver 110, or provided to the solver 110 through the control parameters 112, or some combination of these.

(e) Use the Initial Solution from the Rack Select Method for the Rack Assign Method An initial feasible integer solution to the rack assign optimization sub-problem is to use the optimal solutions from the rack select optimization sub-problem. Because integer programming solvers often spend a large portion of their solution time in finding a first feasible integer solution, this method of using the optimal solution from the rack assign model may help speed up the solution calculation time.

Figure 10:
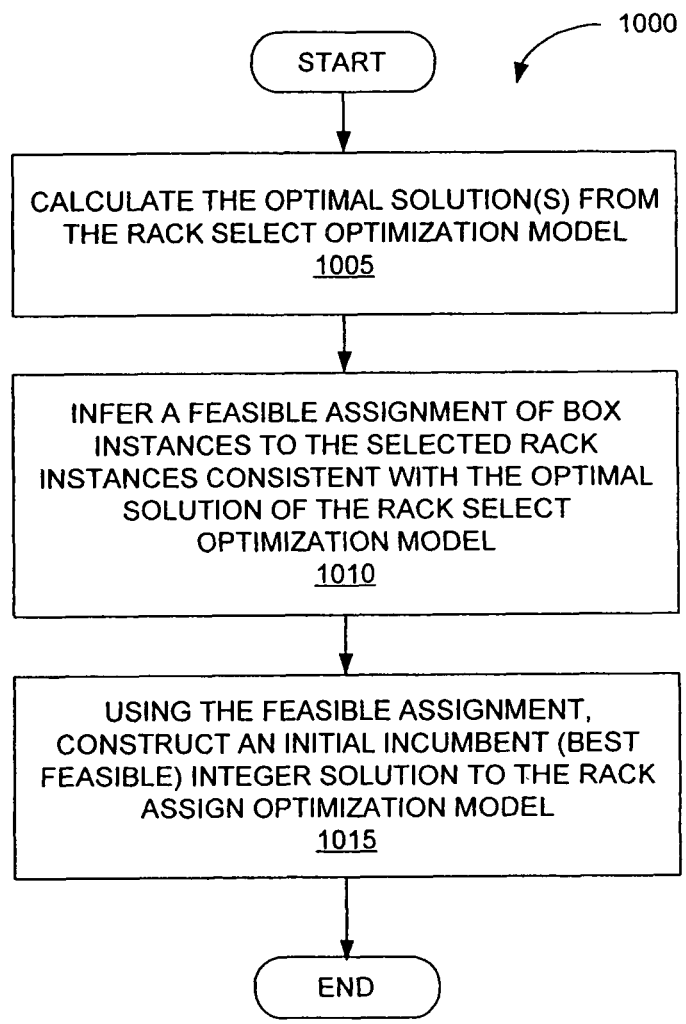
FIG. 10 is a flowchart of using an initial solution from the rack select optimization sub-problem for the rack assign optimization sub-problem, in accordance with an embodiment of the invention.

As shown in the flowchart in FIG. 10, a method 1000 of reducing the calculation time in the rack assign optimization sub-problem includes calculating (1005) the optimal solution(s), such as the Y(r) and NX(bt,r) solutions, in the rack select optimization sub-problem. It is noted that the rack select optimization model typically can only provide a partial solution to the rack assign optimization sub-problem, since the rack select optimization sub-problem is not aware of box instances and their connections. In some cases, it is also noted that whatever information the rack select optimization sub-problem provides to the rack assign optimization sub-problem is typically only for initialization. However, the rack select optimization sub-problem provides information for the rack assign optimization sub-problem the particular racks to consider for box assignments. There are box assignments that can be inferred from the solution to the rack select optimization sub-problem, and these assignments are used as initialization for the rack assign optimization sub-problem but the rack selections from the rack select optimization sub-problem may be permanent.

The method 1000 further includes inferring (1010) a feasible assignment of box instances to the selected rack instances consistent with the optimal solution of the Rack Select optimization sub-problem. Using this feasible assignment, the method 1000 constructs (1015) an initial incumbent (best feasible) integer solution to the Rack Assign optimization sub-problem. This will help speed up solution of the Rack Assign sub-problem. The algorithm for using the initial solution from the rack select method for the rack assign method can be described in the encoded problem specification 108, embedded in the implementation of solver 110, or provided to the solver 110 through the control parameters 112, or some combination of these.

(f) Application of Constraint Branching

Figure 11:
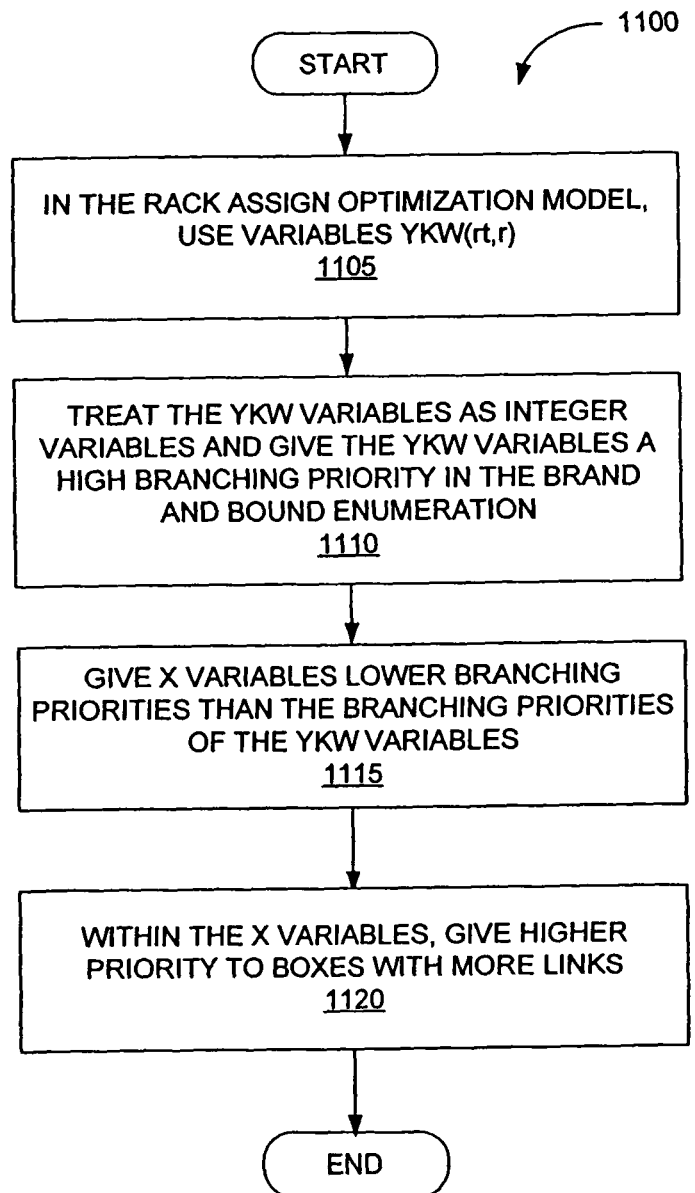
FIG. 11 is a diagram of a method of using constraint branching, in accordance with an embodiment of the invention.

FIG. 11 is a flow diagram to illustrate a method 1100 application of constraint branching, in accordance with an embodiment of the invention. In the rack assign optimization model, the following auxiliary variables YKW(rt,r) may be used (1105). YKW(rt,r) represents the number of boxes assigned to rack (rt,r). Thus, for example, YKW(b, r) is equal to the summation of X(b, r) over boxes b, while YKW(s, r) is equal to the summation of X(s, r) over boxes s. The constraints which enforce this definition are nonbinding, accounting equations that serve to speed up the enumeration. The YKW variables are treated as integer variables and are given a high branching priority in the brand and bound enumeration (action (1110)). The branching priorities of the X variables are lower than the branching priorities of the YKW variables (action 1115). Within the X variables, higher priority is given to boxes with more links (action 1120). Thus, constraint branching may be used to speed up the calculation of the solution in the rack assign optimization sub-problem.

Thus, an embodiment of the invention provides a method of choosing branching priorities in the rack assign optimization sub-problem and selecting what particular variables receive priority. For additional details on constraint branching, see D. M. Ryan and B. A. Foster, "An Integer Programming Approach to Scheduling" in *Computer Scheduling of Public Transport Urban Passenger Vehicle and Crew Scheduling*, edited by A. Wren, North-Holland Publishing Company, North Holland, Amsterdam (1981), pp. 269-280, which is hereby fully incorporated herein by reference. The algorithm for applying constraint branching can be described in the encoded problem specification 108, embedded in the implementation of solver 110, or provided to the solver 110 through the control parameters 112, or some combination of these.

(g) Using the Number of Boxes Assigned to Each Rack in the Rack-Select Phase as a Guideline in the Rack-Assign Phase.

Figure 12:
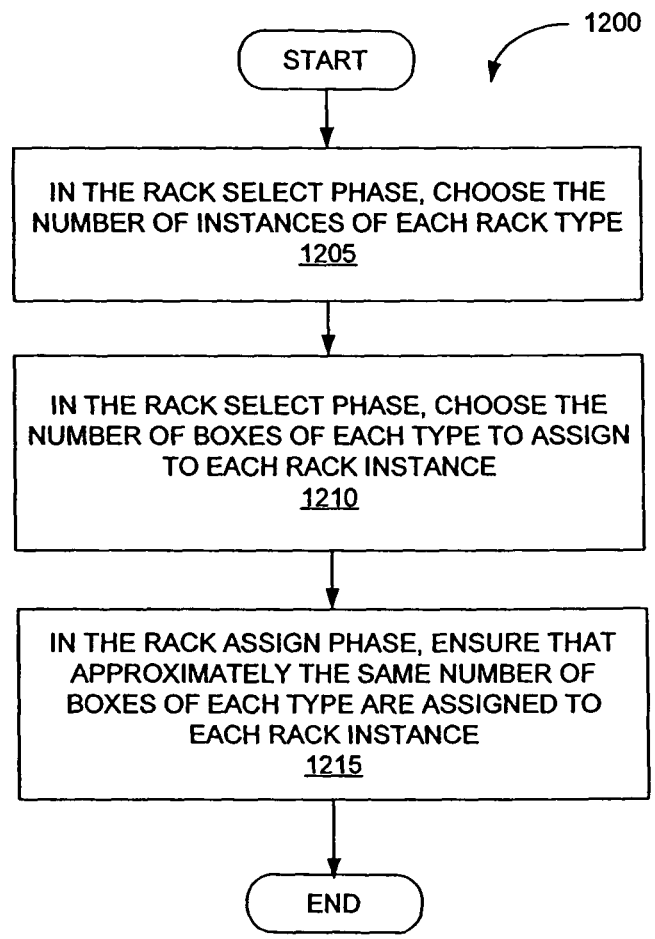
FIG. 12 is a diagram of a method of using the number of boxes assigned to each rack in the rack-select optimization sub-problem as a guideline in the rack-assign optimization sub-problem.

FIG. 12 is a flow diagram of a method 1200 in accordance with an embodiment of the invention. In the rack select phase (rack select optimization sub-problem), the number of instances of each rack type is chosen (action (1205)). In the rack select optimization phase, the number of boxes of each type to assign to each rack instance is chosen (action (1210)). In the rack-assign optimization phase (rack assign optimization sub-problem), we ensure that approximately the same number of boxes of each type are assigned to each rack instance (action (1215)). This helps cut down the search space. It is noted that the method 1200 is a heuristic for speeding up the solution calculation of the problem (at a potential loss of optimality).

For example, if ten (10) hosts are assigned to rack small1 in the rack select space and we allow 20% variation, we would only consider solutions in the rack assign phase where between eight (8) and twelve (12) hosts are assigned to rack small1. The above algorithm can be described in the encoded problem specification 108, embedded in the implementation of solver 110, or provided to the solver 110 through the control parameters 112, or some combination of these.

Meta-Constraints

It is noted that in the rack select optimization sub-problem, the box constraints (such as size, power requirements, UPS requirement, and cooling requirement, or other various combinations of constraints) may be defined by a general commodity or "meta-constraints". A rack is typically assumed to provide a limited supply of the meta-constraint. Thus, the constraints specified in the integer program may be defined as a general commodity. Meta-constraint typically comprises the sum of individual constraints that were mentioned above. For example, we might add the meta-constraint "weight." Each rack instance would have a maximum weight of components it can support. Each component type would have a weight. Then the sum of the weights of all components assigned to a rack could not exceed the rack's weight limit. The algorithm for defining a meta-constraint can be described in the encoded problem specification 108, embedded in the implementation of solver 110, or provided to the solver 110 through the control parameters 112, or some combination of these.

Application to Networked Boxes without Wiring Requirements

It is noted that some boxes r may not require physical links. For example, boxes r that communicate via wireless links or a wireless protocol. Additionally, some boxes may have no connections; and some of these boxes may really be "holes" to reserve space for some reason (e.g., to meet cooling goals, or to provide empty spaces in order to allow for future growth). Some networks may also be implemented with the use of boxes r that require a wired link between the boxes. Thus, in an embodiment of the invention, the wiring constraints noted above may be omitted (alternatively, not supplied as part of the encoded problem specification 108) when solving the various optimization sub-problems or when using the heuristic to locally improve the solution or both. The algorithm for racking, wiring, and/or placement of boxes without wiring requirements can be described in the encoded problem specification 108, embedded in the implementation of solver 110, or provided to the solver 110 through the control parameters 112, or some combination of these.

The various engines or modules discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names (such as $Y(r)$, $NX(bt,r)$, $X(b,r)$, $Z(a,r,b,s)$, and the like) for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method comprising:

obtaining, by a computer, information regarding physical attributes of boxes to be assigned to racks and of a set of available racks, the boxes including networked electronic devices;

identifying, by the computer, particular racks to use, from the set of available racks, by solving a rack select optimization sub-problem using the obtained information;

assigning, by the computer, each of the boxes to one of the particular racks by solving a rack assign optimization sub-problem using the obtained information, the rack assign optimization sub-problem being solved after the rack select optimization sub-problem has been solved;

at least one of: (1) outputting an assignment solution to a user interface, the assignment solution including results of the identifying and the assigning, or (2) placing the boxes into the particular racks based on the assignment solution, wherein solving the rack assign optimization sub-problem includes:

solving for a decision variable X (a,r) to determine if a box (a) is to be assigned to a rack (r), and solving for a decision variable X (b,s) to determine if a box (b) is to be assigned to a rack (s); and solving for a decision variable Z (a,r,b,s) which is a quadratic term X (a,r)*X (b,s).

2. The method of claim 1, wherein variables of Z (a,r,b,s) are treated as continuous to increase a speed of solving the rack assign optimization sub-problem.

3. The method of claim 1, wherein at least one of the rack select optimization sub-problem and the rack assign optimization sub-problem is solved by using an integer-programming solution.

4. The method of claim 1, wherein the boxes are components of a computer network system.

5. The method of claim 1, wherein a constraint of the rack assign optimization sub-problem comprises required connections between the boxes, and where a connection comprises one or more non-physical links formed from at least one of: a wireless link, a free-air/free-space optical link, a laser link, and an acoustic link.

6. The method of claim 1, wherein a constraint of the rack assign optimization sub-problem comprises required connections between the boxes, and where the connections comprise one or more physical links formed from at least one of:
an electrical link;
an optical fibre; and
a mechanical link.

7. The method of claim 6, where at least one of the connections is implemented as at least one of an Ethernet link, InfiniBand link, Fibre Channel link, serial link, point-to-point computer link, point-to-point network link, star computer link, star network link, local area link, wide area link, campus-area link, metropolitan-area link, and a satellite link.

8. The method of claim 1, wherein the rack select optimization sub-problem is solved based upon at least one of the following constraints: a dimension of a box in a particular rack cannot exceed a dimension of the rack, a selected rack meets the power requirements for boxes placed in the selected rack, a box requiring uninterrupted power (UPS) is placed in a rack with adequate UPS capability, heat generated by boxes in a single particular rack is within a particular limit, a certain type of box and a certain type of rack are prohibited as a combination, a box and a backup of the box are placed in separate racks, and a box and a backup of the box are separated by at least some defined distance.

9. The method of claim 1, wherein solving the rack select optimization sub-problem includes at least one of the following objectives: to minimize a total cost of selected racks, to minimize a number of selected racks, to minimize a cost of racks that are not yet owned, to minimize floor space needs, to minimize power requirements, to balance cooling requirements, and to use only a single rack type.

10. The method of claim 1, wherein the rack assign optimization sub-problem is solved based upon at least one of the following constraints: an associated physical attribute of each box, an associated wiring layout requirement of each box, a requirement that a particular box is to be placed in a particular rack, a requirement that a particular box is to not be placed in a particular rack.

11. The method of claim 1, wherein the rack assign optimization sub-problem is solved based upon at least one of the following objectives: to minimize total link length, to minimize a total number of inter-rack links, to minimize a number of links exceeding a defined length, to minimize a total length of inter-rack links, to minimize a cost of inter-rack links, to minimize a number of links crossing between machine rooms, domains, or buildings, to minimize the height of the center of gravity of a rack, to leave space for future growth and slots for new boxes, and to maximize a number of intra-rack links.

12. The method of claim 1, wherein solving the rack select optimization sub-problem includes:
requiring an anti-symmetry constraint so that a particular rack will be required to be used for holding a box before a second rack is used for holding a box.

13. The method of claim 1, wherein solving the rack select optimization sub-problem comprises:
defining a meta-constraint comprising a sum of particular constraints of boxes assigned to a given rack; and
assigning the boxes to the given rack only if the meta-constraint does not exceed a capacity for the meta-constraint of the particular rack. box.

14. A method comprising:
obtaining, by a computer, information regarding physical attributes of boxes to be assigned to racks and of a set of available racks, the boxes including networked electronic devices;
identifying, by the computer, particular racks to use, from the set of available racks, by solving a rack select optimization sub-problem using the obtained information;
assigning, by the computer, each of the boxes to one of the particular racks by solving a rack assign optimization sub-problem using the obtained information, the rack assign optimization sub-problem being solved after the rack select optimization sub-problem has been solved;
at least one of: (1) outputting an assignment solution to a user interface, the assignment solution including results of the identifying and the assigning, or (2) placing the boxes into the particular racks based on the assignment solution; and
determining a physical location of each rack that will hold at least one box by solving a rack layout optimization sub-problem, the solving of the rack layout optimization sub-problem including solving for a plurality of decision variables to determine if a rack is to be assigned to a given location, wherein solving the rack layout optimization sub-problem includes:
solving for a decision variable X (r,L) to determine if a rack (r) is to be assigned to a location (L), and
solving for a decision variable X (s,M) to determine if a rack (s) is to be assigned to a location (M); and
solving for a decision variable Z (r,L,s,M) which is a quadratic term X (r,L)*X (s,M).

15. The method of claim 14, wherein variables of Z (r,L,s,M) are treated as continuous to increase a speed of solving the rack layout optimization sub-problem.

16. An article of manufacture comprising a non-transitory machine-readable storage medium storing a computer program, said computer program upon execution causing a computer to:
obtain information regarding physical attributes of boxes to be assigned to racks and of a set of available racks, the boxes including networked electronic devices;

identify particular racks to use, from the set of available racks, by solving a rack select optimization sub-problem using the obtained information;

assign each of the boxes to one of the particular racks by solving a rack assign optimization sub-problem using the obtained information, the rack assign optimization sub-problem being solved after the rack select optimization sub-problem has been solved;

output an assignment solution to a user interface, the assignment solution including results of the identifying and the assigning; and determine a physical location of each rack that will hold at least one box by solving a rack layout optimization sub-problem, wherein solving the rack layout optimization sub-problem includes:

solving for a decision variable X (r,L) to determine if a rack (r) is to be assigned to a location (L), solving for a decision variable X (s,M) to determine if a rack (s) is to be assigned to a location (M), and solving for a decision variable Z (r,L,s,M) which is a quadratic term X (r,L)*X (s,M).

17. The article of manufacture of claim 16, wherein solving the rack select optimization sub-problem includes:

solving for a decision variable Y (r) to determine if a rack (r) is to be used to hold a box; and solving for a decision variable NX (bt,r) to determine the number of boxes of type (bt) to be placed in a rack (r).

18. The article of manufacture of claim 16, wherein the variables of Z (r,L,s,M) are treated as continuous to increase a speed of solving the rack layout optimization sub-problem.

19. The article of manufacture of claim 16, wherein solving the rack assign optimization sub-problem comprises using a number of boxes assigned to each rack in the rack select optimization sub-problem as a guideline, wherein the number of boxes is used:

to choose a number of instances of each rack type;
to choose a number of boxes of each type to assign to each rack.

20. The article of manufacture of claim 16, wherein at least one of the rack select optimization sub-problem and the rack assign optimization sub-problem is solved by using an integer-programming solution.

21. The article of manufacture of claim 16, wherein the boxes are components of a computer network system.

22. The article of manufacture of claim 16, wherein a constraint of the rack assign optimization sub-problem comprises required connections between the boxes, and where a connection comprises one or more non-physical links formed from at least one of: a wireless link, a free-air/free-space optical link, a laser link, and an acoustic link.

23. The article of manufacture of claim 16, wherein a constraint of the rack assign optimization sub-problem comprises required connections between the boxes, and where the connections comprise one or more physical links formed from at least one of:

an electrical link, comprising at least one of a conductive wire, and a copper cabling;
an optical fibre; and
a mechanical link, comprising at least one of a string, a rope, a tape, a wire, a pipe, a tube, a channel, and a hydraulic line.

24. The article of manufacture of claim 23, where at least one of the connections is implemented as at least one of an Ethernet link, InfiniBand link, Fibre Channel link, serial link, point-to-point computer link, point-to-point network link, star computer link, star network link, local area link, wide area link, campus-area link, metropolitan-area link, and a satellite link.

25. The article of manufacture of claim 16, wherein said computer program is executable to input design considerations for the optimization sub-problems coded in a specified integer programming language.

26. The article of manufacture of claim 16, wherein the rack select optimization sub-problem is solved based upon at least one of the following constraints: a dimension of a box in a particular rack cannot exceed a dimension of the rack, a selected rack meets the power requirements for boxes placed in the selected rack, a box requiring uninterrupted power (UPS) is placed in a rack with adequate UPS capability, heat generated by boxes in a single particular rack is within a particular limit, a certain type of box and a certain type of rack are prohibited as a combination, a box and a backup of the box are placed in separate racks, and a box and a backup of the box are separated by at least some defined distance.

27. The article of manufacture of claim 16, wherein solving the rack select optimization sub-problem includes at least one of the following objectives: to minimize a total cost of selected racks, to minimize a number of selected racks, to minimize a cost of racks that are not yet owned, to minimize floor space needs, to minimize power requirements, to balance cooling requirements, and to use only a single rack type.

28. The article of manufacture of claim 16, wherein the rack assign optimization sub-problem is solved based upon at least one of the following constraints: an associated physical attribute of each box, an associated wiring layout requirement of each box, a requirement that a particular box is to be placed in a particular rack, a requirement that a particular box is to not be placed in a particular rack.

29. The article of manufacture of claim 16, wherein the rack assign optimization sub-problem is solved based upon at least one of the following objectives: to minimize total link length, to minimize a total number of inter-rack links, to minimize a number of links exceeding a defined length, to minimize a total length of inter-rack links, to minimize a cost of inter-rack links, to minimize a number of links crossing between machine rooms, domains, or buildings, to minimize the height of the center of gravity of a rack, to leave space for future growth and slots for new boxes, and to maximize a number of intra-rack links.

30. The article of manufacture of claim 16, wherein the rack layout optimization sub-problem is solved based upon at least one of the following objectives: to minimize a total link length, to minimize a total number of inter-rack links, to minimize a number of links exceeding a defined length, to minimize a cost of inter-rack links, to minimize a total length of inter-rack links, to minimize a number of links crossing between machine rooms, domains, or buildings, to minimize floor space needs, to minimize power requirements, and to balance cooling requirements.

31. The article of manufacture of claim 16, wherein solving the rack select optimization sub-problem includes:

requiring an anti-symmetry constraint so that a particular rack (r) will be required to be used for holding a box before a second rack (r+1) is used for holding a box.

32. The article of manufacture of claim 16, wherein solving the rack assign optimization sub-problem includes:

using an initial solution from the rack select optimization sub-problem for the rack assign optimization sub-problem.

33. The article of manufacture of claim 16, wherein solving the rack assign optimization sub-problem includes:
using a lower bound from an initial solution from the rack select optimization sub-problem as an input.

34. The article of manufacture of claim 16, wherein solving the rack assign optimization sub-problem includes:
using constraint branching to increase solution calculation process speed.

35. The article of manufacture of claim 16, wherein the boxes form at least one network comprising:
at least one of a computer network, a universal data center, an Internet data center, a telecommunications network, a storage network, a storage area network (SAN), a local area network (LAN), a wide area network (WAN), a disk array, a tape library, a hub, a switch, and a router.

36. The article of manufacture of claim 16, wherein solving the rack select optimization sub-problem comprises:
defining a meta-constraint comprising a sum of particular constraints of boxes assigned to a given rack; and
assigning the boxes to the given rack only if the meta-constraint does not exceed a capacity for the meta-constraint of the particular rack.

37. An article of manufacture comprising a non-transitory machine-readable storage medium storing a computer program, said computer program upon execution causing a computer to:
obtain information regarding physical attributes of boxes to be assigned to racks and of a set of available racks, the boxes including networked electronic devices;
identify particular racks to use, from the set of available racks, by solving a rack select optimization sub-problem using the obtained information;
assign each of the boxes to one of the particular racks by solving a rack assign optimization sub-problem using the obtained information, the rack assign optimization sub-problem being solved after the rack select optimization sub-problem has been solved;
output an assignment solution to a user interface, the assignment solution including results of the identifying and the assigning; and determine a physical location of each rack that will hold at least one box by solving a rack layout optimization sub-problem,
wherein solving the rack assign optimization sub-problem includes: solving for a decision variable X (a,r) to determine if a box (a) is to be assigned to a rack (r);
solving for a decision variable X (b,s) to determine if a box (b) is to be assigned to a rack (s); and
solving for a decision variable Z (a,r,b,s) which is a quadratic term X (a,r)*X (b,s).

38. The article of manufacture of claim 37, wherein variables of Z (a,r,b,s) are treated as continuous to increase a speed of solving the rack assign optimization sub-problem.

* * * * *